US012585252B2

(12) United States Patent
Weiss et al.

(10) Patent No.: US 12,585,252 B2
(45) Date of Patent: Mar. 24, 2026

(54) METHOD FOR AUTOMATICALLY ADJUSTING MANUFACTURING LIMITS PRESCRIBED ON AN ASSEMBLY LINE

(71) Applicant: Instrumental, Inc., Palo Alto, CA (US)

(72) Inventors: Samuel Bruce Weiss, Sunnyvale, CA (US); Anna-Katrina Shedletsky, Sunnyvale, CA (US); Rustem Feyzkhanov, Sunnyvale, CA (US); Isaac Sukin, Sunnyvale, CA (US); Jack Robbins, Sunnyvale, CA (US); Juyong Do, Sunnyvale, CA (US); Prerna Dhareshwar, Sunnyvale, CA (US)

(73) Assignee: Instrumental, Inc., Palo Alto, CA (US)

( * ) Notice: Subject to any disclaimer, the term of this patent is extended or adjusted under 35 U.S.C. 154(b) by 697 days.

(21) Appl. No.: 17/988,697

(22) Filed: Nov. 16, 2022

(65) Prior Publication Data

US 2023/0152785 A1    May 18, 2023

Related U.S. Application Data

(60) Provisional application No. 63/279,918, filed on Nov. 16, 2021.

(51) Int. Cl.
G05B 19/418    (2006.01)
G06T 7/00    (2017.01)

(52) U.S. Cl.
CPC ... G05B 19/4184 (2013.01); G05B 19/41805 (2013.01); G05B 19/4188 (2013.01); G06T 7/0004 (2013.01)

(58) Field of Classification Search
CPC .......... G05B 19/4184; G05B 19/41805; G05B 19/4188; G06T 7/0004
See application file for complete search history.

(56) References Cited

U.S. PATENT DOCUMENTS

| | | | | | |
|---|---|---|---|---|---|
| 11,132,787 | B2 * | 9/2021 | Weiss | ...................... | G06T 7/001 |
| 2022/0067898 | A1 * | 3/2022 | Chen | ...................... | G06T 7/001 |
| 2022/0309634 | A1 * | 9/2022 | Atwood | ................. | G06V 10/82 |

* cited by examiner

*Primary Examiner* — Gregory A Morse
*Assistant Examiner* — Rohan Tejas Mukundhan
(74) *Attorney, Agent, or Firm* — Run8 Patent Group, LLC; Peter Miller

(57) ABSTRACT
A method includes accessing feature values representing a historical population of assembly units assembled on an assembly line; and accessing a failure status of the assembly unit at a target test on the assembly line. The method also includes, for each feature: deriving a correlation between values of the feature and failure status at the target test; deriving an effective limit of the feature based on scope of feature values in the historical population of assembly units; and calculating an action score for the feature based on the correlation and a width of the effective limit. The method further includes: selecting a particular feature exhibiting greatest action score; defining a preemptive test for the particular feature upstream of the target test during a next assembly period; and assigning a target limit, narrower than an effective limit of the particular feature, to the preemptive test.

20 Claims, 7 Drawing Sheets

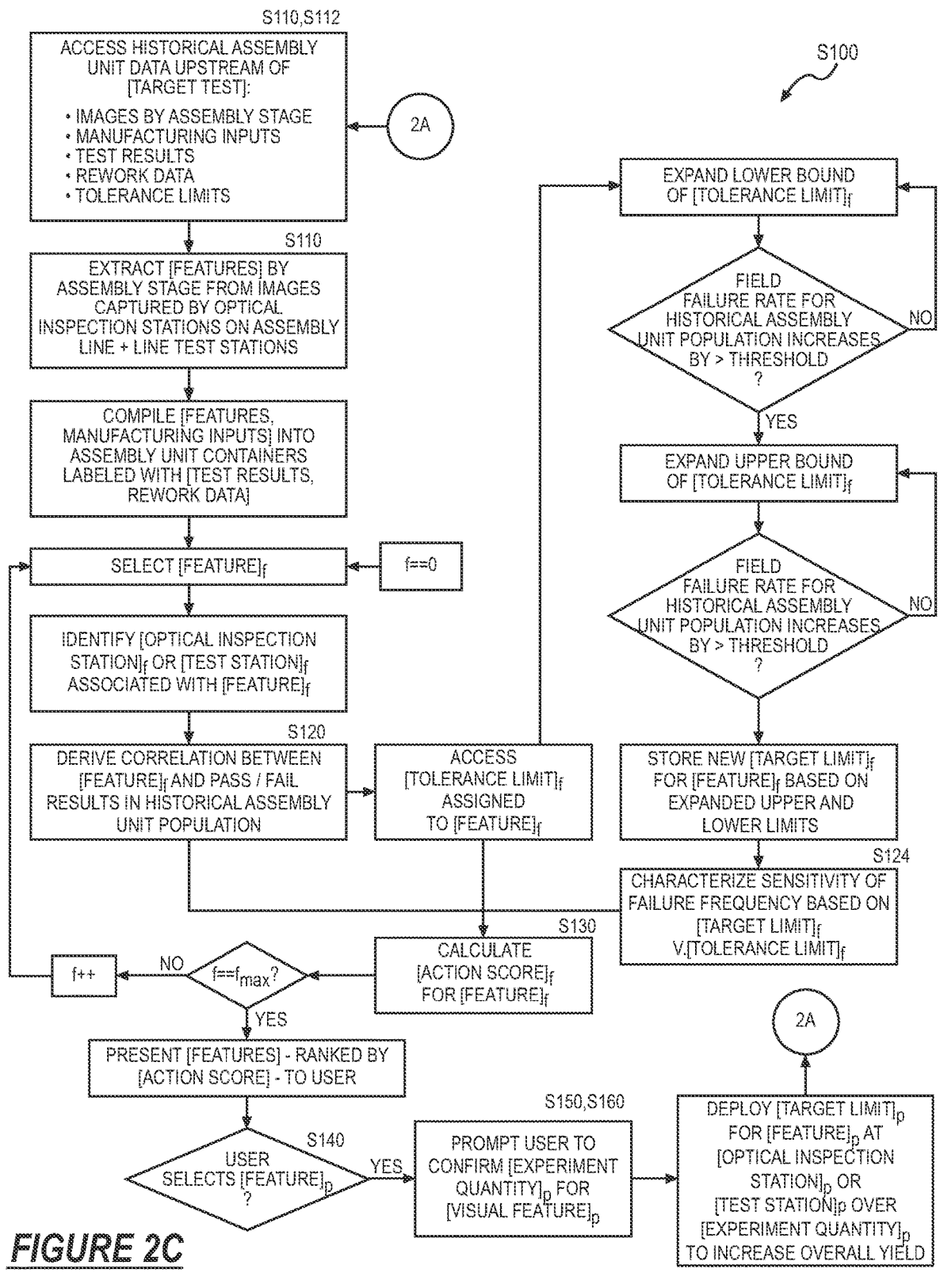

S110,S112

ACCESS HISTORICAL ASSEMBLY UNIT DATA UPSTREAM OF [TARGET TEST]:

• IMAGES BY ASSEMBLY STAGE
• MANUFACTURING INPUTS
• TEST RESULTS
• REWORK DATA
• TOLERANCE LIMITS

2A

S100

S110

EXTRACT [FEATURES] BY ASSEMBLY STAGE FROM IMAGES CAPTURED BY OPTICAL INSPECTION STATIONS ON ASSEMBLY LINE + LINE TEST STATIONS

COMPILE [FEATURES, MANUFACTURING INPUTS] INTO ASSEMBLY UNIT CONTAINERS LABELED WITH [TEST RESULTS, REWORK DATA]

SELECT [FEATURE]$_f$   ←   f==0

IDENTIFY [OPTICAL INSPECTION STATION]$_f$ OR [TEST STATION]$_f$ ASSOCIATED WITH [FEATURE]$_f$

S120

DERIVE CORRELATION BETWEEN [FEATURE]$_f$ AND PASS / FAIL RESULTS IN HISTORICAL ASSEMBLY UNIT POPULATION

ACCESS [TOLERANCE LIMIT]$_f$ ASSIGNED TO [FEATURE]$_f$

EXPAND LOWER BOUND OF [TOLERANCE LIMIT]$_f$

FIELD FAILURE RATE FOR HISTORICAL ASSEMBLY UNIT POPULATION INCREASES BY > THRESHOLD ?   NO

YES

EXPAND UPPER BOUND OF [TOLERANCE LIMIT]$_f$

FIELD FAILURE RATE FOR HISTORICAL ASSEMBLY UNIT POPULATION INCREASES BY > THRESHOLD ?   NO

STORE NEW [TARGET LIMIT]$_f$ FOR [FEATURE]$_f$ BASED ON EXPANDED UPPER AND LOWER LIMITS

S124

CHARACTERIZE SENSITIVITY OF FAILURE FREQUENCY BASED ON [TARGET LIMIT]$_f$ V.[TOLERANCE LIMIT]$_f$

S130

CALCULATE [ACTION SCORE]$_f$ FOR [FEATURE]$_f$ f++   ←   NO   f==f$_{max}$?

YES

2A

PRESENT [FEATURES] - RANKED BY [ACTION SCORE] - TO USER

S140

USER SELECTS [FEATURE]$_p$ ?   YES

S150,S160

PROMPT USER TO CONFIRM [EXPERIMENT QUANTITY]$_p$ FOR [VISUAL FEATURE]$_p$

DEPLOY [TARGET LIMIT]$_p$ FOR [FEATURE]$_p$ AT [OPTICAL INSPECTION STATION]$_p$ OR [TEST STATION]$p$ OVER [EXPERIMENT QUANTITY]$_p$ TO INCREASE OVERALL YIELD

*FIGURE 2C*

METHOD FOR AUTOMATICALLY ADJUSTING MANUFACTURING LIMITS PRESCRIBED ON AN ASSEMBLY LINE

CROSS-REFERENCE TO RELATED APPLICATIONS

This application claims priority to U.S. Provisional Patent Application No. 63/279,918, filed on 16 Nov. 2021, which is incorporated in its entirety by this reference.

This Application is related to U.S. patent application Ser. Nos. 15/407,158, 15/407,162, 15/653,040, 15/953,206, 17/202,262, and 17/461,773, each of which is incorporated in its entirety by this reference

TECHNICAL FIELD

This invention relates generally to the field of optical inspection and more specifically to a new and useful method for automatically adjusting manufacturing limits prescribed on an assembly line in the field of manufacturing.

BRIEF DESCRIPTION OF THE FIGURES

FIGS. 2A, 2B, and 2C are a flowchart representation of one variation of the method;

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

Figure 1:
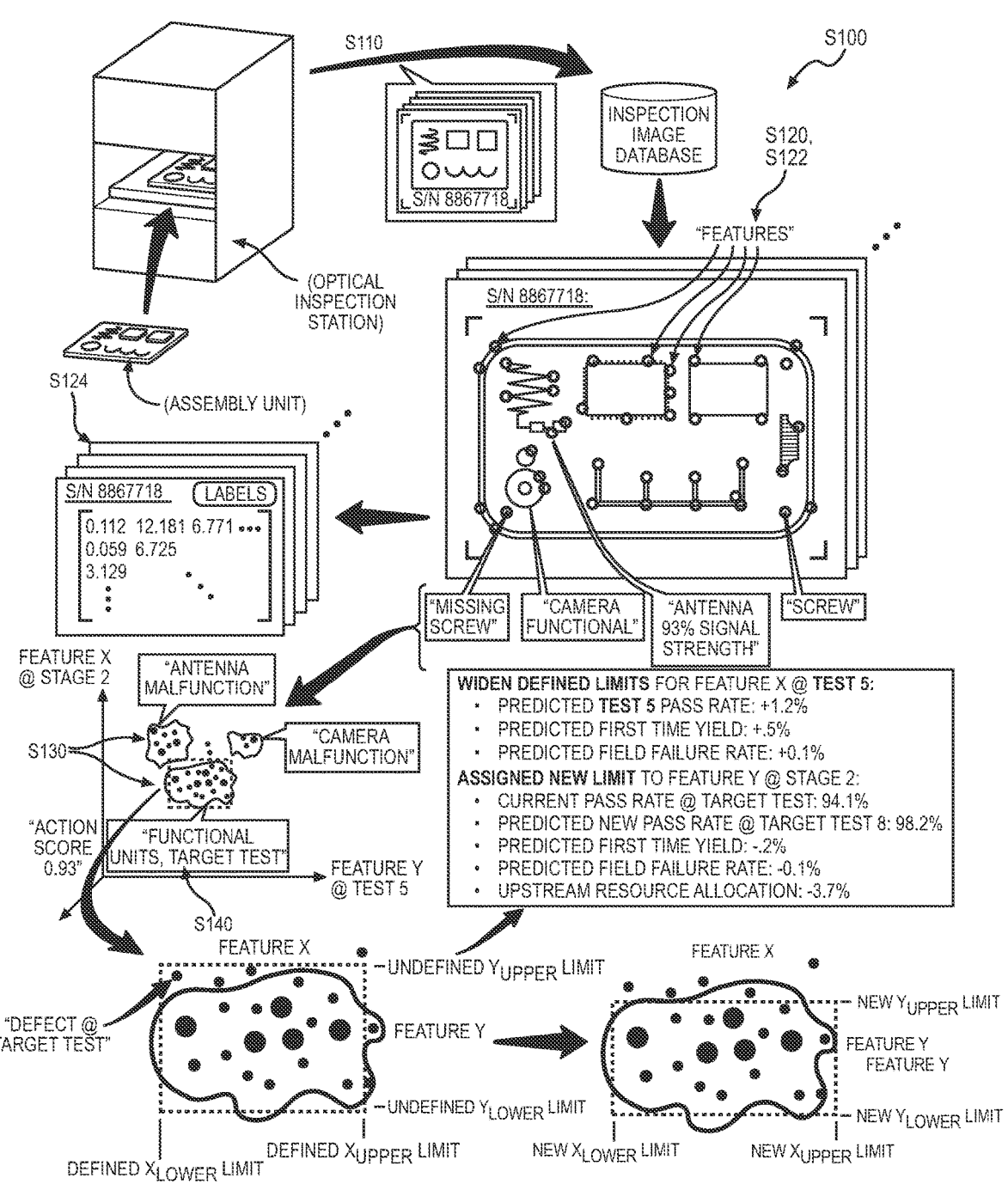
FIG. 1 is a flowchart representation of a method.
Figure 2A:
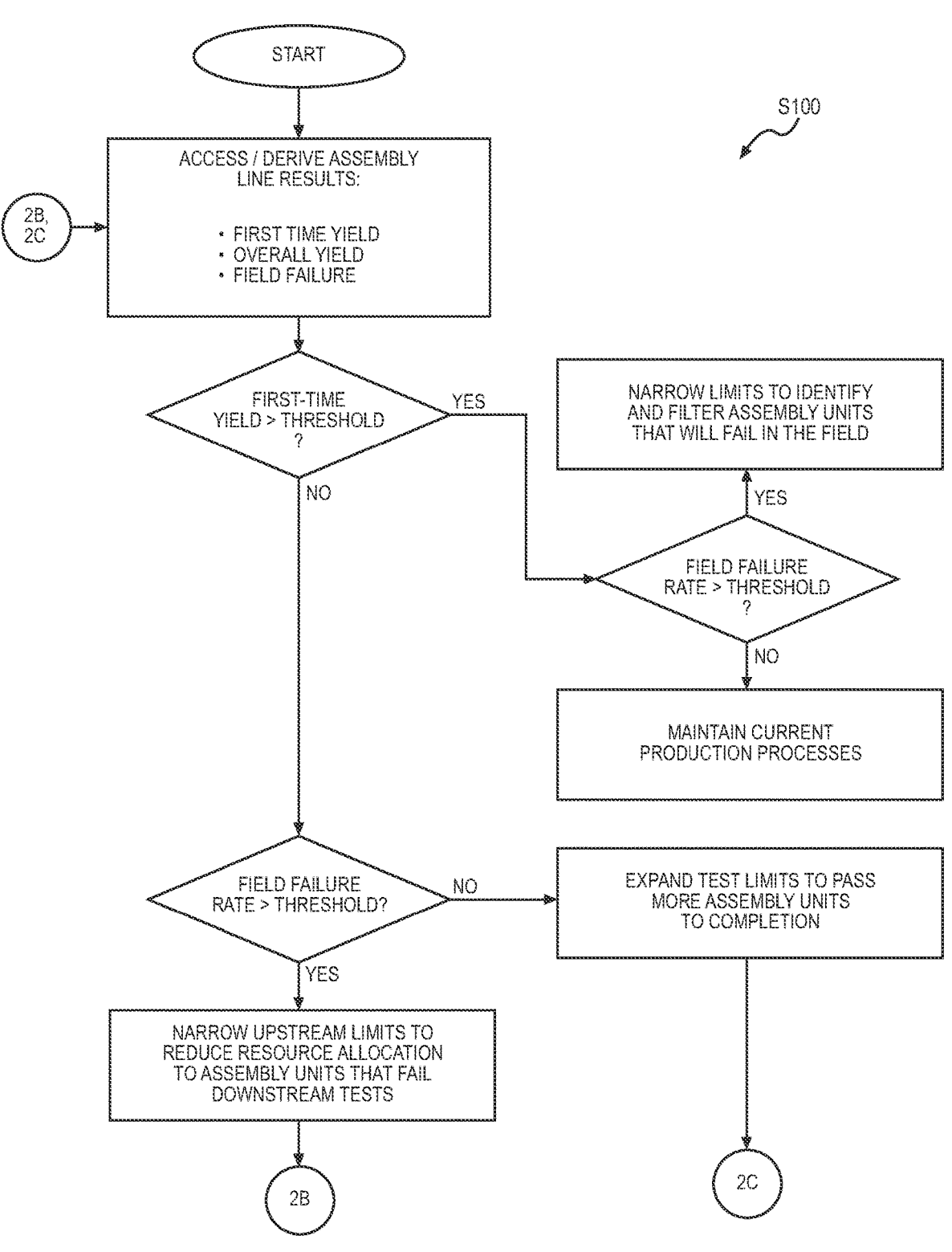
Figure 2B:
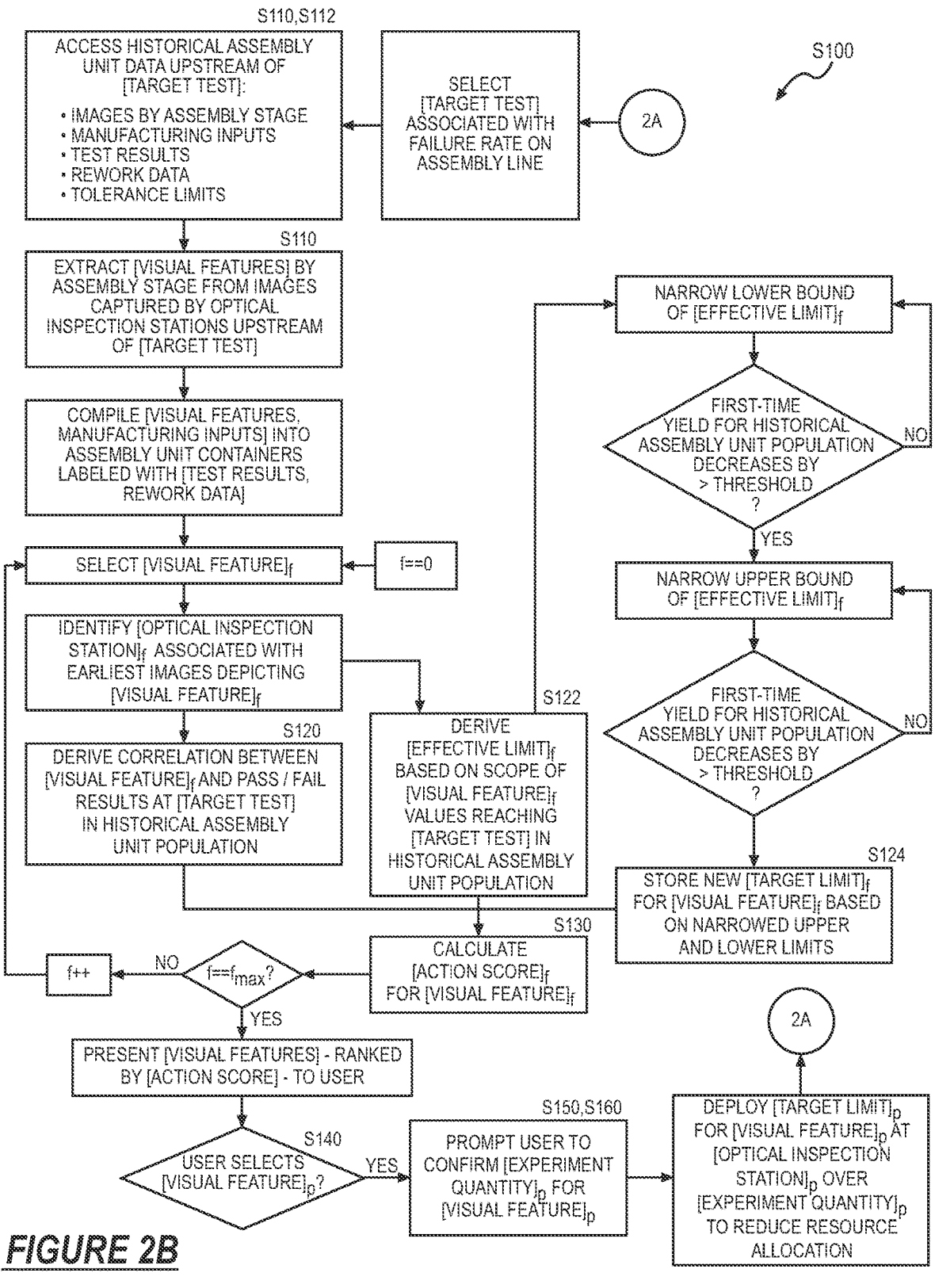

1. Method: Upstream Limit Reduction for Reduced Downstream Resource Allocation As shown in FIGS. 1, 2A, and 2B, a method includes, for each assembly unit in a historical population of assembly units assembled on an assembly line during a first time period and tested according to a target test following a target assembly stage on the assembly line: accessing feature values, of a corpus of visual features, extracted from a set of images of the assembly unit, the set of images captured by a set of optical inspection stations arranged on the assembly line upstream of the target test in Block S110; and accessing a failure status (and/or test data) of the assembly unit at the target test in Block S112.

The method also includes, for each visual feature, in the corpus of visual features: deriving a correlation between feature values, of the visual feature, and failure status (and/or test results) at the target test in Block S120; deriving an effective limit of the visual feature based on scope of feature values, of the visual feature, in the historical population of assembly units in Block S122; and calculating an action score for the visual feature in Block S130 proportional to the correlation and a width of the effective limit of the visual feature.

The method further includes: selecting a particular visual feature, from the corpus of visual features, based on a particular action score of the particular visual feature in Block S140; and generating a prompt—in Block S150—to a) insert a preemptive test for the particular visual feature upstream of the target assembly stage during a second time period succeeding the first time period and b) assign a target limit, narrower than an effective limit of the particular visual feature, to the preemptive test; and serving the prompt to a user affiliated with the assembly line in Block S160.

1.1 Method: Selective Limit Expansion for Yield Increase

As shown in FIGURES FIGS. 1, 2A, and 2C, one variation of the method includes, for each assembly unit in a historical population of assembly units assembled on an assembly line during a first time period: accessing feature values, of a corpus of visual features, extracted from a set of images of the assembly unit, the set of images captured by a set of optical inspection stations arranged on the assembly line in Block S110; and accessing a failure status (and/or test data) of the assembly unit in Block S112.

This variation of the method also includes, for each visual feature, in the corpus of visual features: deriving a correlation between feature values, of the visual feature, and failure status (and/or test results) within the historical population of assembly units in Block S120; accessing a tolerance limit assigned to the visual feature in Block S122; characterizing a sensitivity of a failure frequency within the historical population of assembly units based on feature values of assembly units falling outside of the tolerance limit assigned to the visual feature in Block S124; and calculating an action score for the visual feature inversely proportional to the correlation and the sensitivity of the failure frequency in Block S130.

This variation of the method further includes: selecting a particular visual feature, from the corpus of visual features, based on a particular action score of the particular visual feature in Block S140; generating a prompt to reduce failure frequency of assembly units assembled on the assembly line by increasing width of a particular tolerance limit of the particular visual feature during a second time period succeeding the first time period in Block S150; and serving the prompt to a user affiliated with the assembly line in Block S160.

2. Applications

Figure 5:
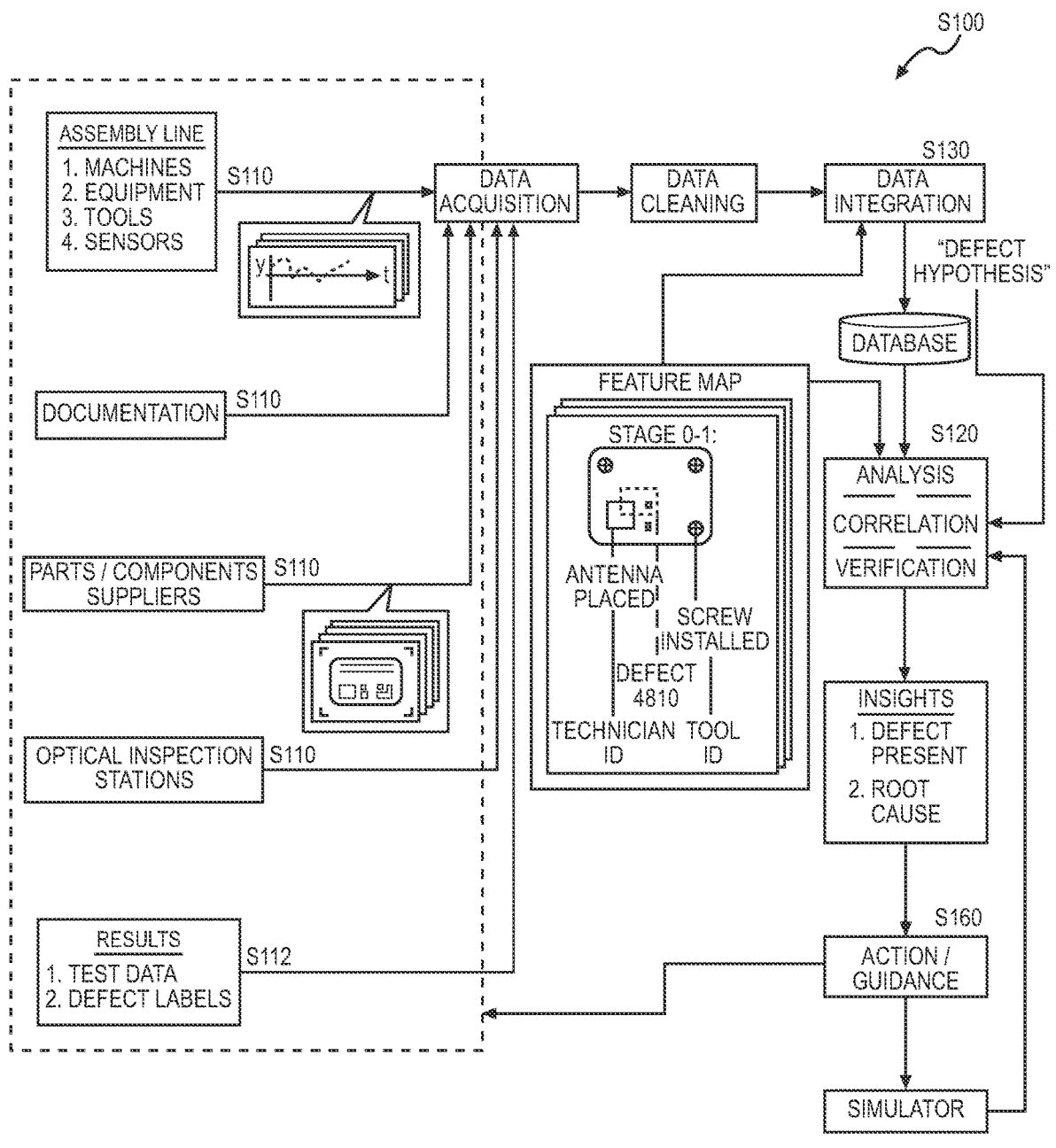
FIG. 5 is a flowchart representation of one variation of the method.

As shown in FIGS. 1 and 5, a computer system—cooperating with assembly, inspection, and test equipment on an assembly line and/or cooperating with a database that aggregates data from an assembly line—can execute a method to: characterize completion rate of assembly units produced on the assembly line (e.g., a ratio of assembly units completed on the assembly line to assembly units initiated on the assembly line) based on manufacturing data collected for assembly units completed on the assembly line; characterize yield (e.g., first-time yield, overall yield) for the assembly line based on production (e.g., yield, test, rework) data collected on the assembly line; characterize field failures of assembly units produced on the assembly line based on field data collected for these assembly units; and selectively generate recommendations to a) modify limits (hereinafter "tolerances") for spatial or non-spatial characteristics of assembly units tested during production and b) modify upstream process to improve allocation of resources on the assembly line, increase first-time and overall yield, decrease field failures, and/or shift these results into ranges set by an operator.

For example, if the completion rate of assembly units on the assembly line is low but the ratio of completed units that pass final tests on the assembly line is high, tolerances for tested characteristics of assembly units at intermediate assembly stages on the assembly line may be so tight that assembly units are unnecessarily discarded or sent for rework rather than passed on to next stages of assembly and successfully completed. Conversely, in this scenario, these tolerances may be appropriate, and specific upstream manufacturing process changes may improve a rate of assembly units that meet these tolerances and thus improve first-time yield. Therefore, the computer system can execute Blocks of the method to: compare visual and nonvisual features of assembly units started, successfully completed, and unsuccessfully completed on the assembly line; predict the source of the low completion rate on the assembly line based on these features; and then generate and serve a targeted recommendation to either a) widen a tolerance to pass more assembly units downstream on the assembly unit or b) investigate modification to upstream processes to improve completion rate and first-time yield.

Similarly, if the first-time yield for the assembly line is low and field failure rate for assembly units completed on the assembly line is low, tolerances for tested characteristics of assembly units following a final assembly stage on the assembly line may be so tight that assembly units are unnecessarily discarded or sent for rework rather than passed forward to a next stage on the assembly line. Conversely, in this scenario, these tolerances may be appropriate, and specific upstream manufacturing process changes may improve a rate of assembly units that meet these tolerances and thus improve first-time yield. Therefore, the computer system can execute Blocks of the method to: compare visual and nonvisual features of assembly units started, successfully completed, and unsuccessfully completed on the assembly line; predict the source of the low yield from the assembly line based on these features; and then generate and serve a targeted recommendation to either widen a tolerance to pass more assembly units completed on the assembly line or investigate modification to upstream processes to improve first-time yield from the assembly unit.

The method is described herein as executed by the computer system to: systematically validate limits (or "tolerances") assigned to visual and nonvisual characteristics (or "features") of assembly units assembled on an assembly line; and to selectively generate prompts a) to modify tolerances that control downstream flow of assembly units along the assembly line and b) to modify manufacturing upstream processes to better achieve validated downstream tolerances. However, the method can be similarly implemented by the computer system for singular parts (e.g., molded, cast, stamped, or machined parts), subassemblies, or assemblies produced on multiple distinct or disconnected assembly lines, etc.

2.1 Limit+Process Discovery

Therefore, the computer system can execute Blocks of the method to: access historical assembly line production data for a population of assembly units previously assembled on the assembly line, assembly line function test results for these assembly units, first-time and overall yield results for these assembly units, and field failure data for these assembly units; compile these data to calculate reduction in tolerance limits for a first upstream feature to reduce downstream resource allocation for future assembly units; compile these data to calculate expansion in tolerance limits for a second feature to reduce rejection rate for future assembly units; and thus increase first-time and overall yield, control resource allocation on the assembly line, and maintain or improve field failure rate.

Accordingly, the computer system can automatically generate and present these insights to a user (e.g., an assembly line operator or manager) to: avoid unnecessary convergence on tighter tolerances to reduce field failures; avoid unnecessary convergence on excess rework to increase overall yield; and/or avoid unnecessary resource investment in further downstream assembly of assembly units bound to fail an assembly line function test or in the field.

In particular, the computer system can execute Blocks of the method to support discovery of particular visual features (e.g., geometric, dimensional physical features) and/or nonvisual features (e.g., assembly inputs, component batch characteristics) that, when subject to tighter tolerances: reduce downstream allocation of assembly and component resources to assembly units that will inevitably fail functional assembly line tests and/or fail in the field; and concurrently produce limited or no decrease in first-time yield or overall yield from the assembly line. More specifically, the computer system can execute Blocks of the method to define new limits and/or redefine existing limits in order to: filter defective assembly units earlier on the assembly line (e.g., for discard or rework) and thus improve resource allocation on the assembly line; and produce limited reduction in first-time yield and/or require limited increase in assembly unit rework to maintain current overall yield from the assembly line.

Additionally or alternatively, the computer system can execute Blocks of the method to support discovery of particular features that, when subject to wider tolerances: produce little or no increase in field failure rate or maintain a field failure rate below a target maximum field failure rate; increase first-time and/or overall yield; reduce frequency of assembly unit rework; and produce limited or no increase in allocation of assembly and component resources to production of assembly units that will fail downstream assembly line tests.

2. Terms

Generally, "completion rate" is referred to herein as a ratio of the quantity of assembly units that reach a final stage of assembly on the assembly line to the quantity of assembly units initiated at the assembly line.

Generally, "final pass rate" is referred to herein as a ratio of the quantity of assembly units that reach a final stage of assembly on the assembly line and pass all final tests to the quantity of assembly units that reach the final stage of assembly on the assembly line.

Generally, "first-time yield" is referred to herein as a ratio of the quantity of assembly units that pass all test following a final stage of assembly on the assembly line—and without rework—to the quantity of assembly units initiated at the assembly line.

Generally, "overall yield" is referred to herein as a ratio of the quantity of assembly units that pass all test following a final stage of assembly on the assembly line—and both with and without rework—to the quantity of assembly units initiated at the assembly line.

Generally, "yield" is referred to herein as "overall yield" unless indicated otherwise.

Generally, "field failure rate" is referred to herein as a ratio of the quantity of sold or deployed assembly units returned with a noted failure or defect to the quantity of assembly units that passed all test following a final stage of assembly on the assembly line.

3. System

Blocks of the method can be executed by a computer system, such as: locally on an optical inspection station (as described below) at which inspection images of assembly units are recorded; locally near an assembly line populated with optical inspection stations; within a manufacturing space or manufacturing center occupied by this assembly line; or remotely at a remote server connected to optical inspection stations via a computer network (e.g., the Internet), etc. The computer system can also interface directly with other sensors arranged along or near the assembly line to collect non-visual manufacturing and test data or retrieve these data from a report database associated with the assembly. Furthermore, the computer system can interface with databases containing other non-visual manufacturing data for assembly units produced on this assembly line, such as: test data for batches of components supplied to the assembly line; supplier, manufacturer, and production data for components supplied to the assembly line; etc.

The computer system can also interface with a user (e.g., an engineer, an assembly line worker) via a user portal—such as accessible through a web browser or native application executing on a laptop computer or smartphone—to serve prompts and notifications to the user and to receive defect labels, anomaly feedback, or other supervision from the user.

4. Assembly Unit and Assembly Line Data

Generally, the computer system implements methods and techniques described in U.S. patent application Ser. No. 17/461,773 to access assembly unit-specific data captured upstream of and along an assembly line, such as in the form of containers or vectors: specific to individual assembly units; containing representations of visual data extracted from images of corresponding assembly units; containing representations of nonvisual data collected from components and other manufacturing inputs into corresponding assembly units; and labeled within interim test results, final test results, and/or field failure types.

The computer system can then compile data contained in these assembly unit-specific containers or vectors to derive completion rate, final pass rate, first-time yield, overall yield, and/or field failure rate for the assembly line.

5, Short-Term Feedback: No Field Failure Data

In one implementation, the computer system executes Blocks of the method to generate prompts to modify limits and/or investigate upstream process based on data captured on and upstream of the assembly line and without field failure data, such as early during manufacture of an initial run of assembly units on an assembly line and/or before a first batch of assembly units are sold to and/or deployed by end users.

5.1 High Assembly Unit Completion Rate With Low Final Pass Rate

In one implementation, if the completion rate for the assembly line is high (e.g., 95%) but the final pass rate for the assembly unit is low (e.g., 70%), unnecessary resources may be invested in producing and completing assembly units that either cannot be reworked or require excess and expensive rework to correct.

Accordingly, the computer system can: implement methods and techniques described in U.S. patent application Ser. Nos. 17/202,262 and 17/461,773 to: identify visual and/or non-visual features of assembly units that exhibit high correlation with failure to pass final tests following the final stage of assembly on the assembly line; generate a prompt to investigate upstream tolerances to catch defective assembly units earlier during manufacture or modify upstream processes to reduce frequency of defective assembly units; and then serve this prompt to a user (e.g., manufacturing engineer).

For example, the computer system can execute a "low final pass rate cycle" to: identify a first group of assembly units that passed a particular test upon completion on the assembly line and exhibit a first (visual or non-visual) feature within a first value range; identify a second group of assembly units that failed the particular test and exhibit the first feature within a second value range disjoint (i.e., non-overlapping) the first value range; and correlate the first feature with the failure to pass the particular test. Then, if the first feature is a visual feature, the computer system can implement methods and techniques described in U.S. patent application Ser. No. 17/461,773 to link the visual feature to a location, component, process, operator, assembly stage, or other manufacturing input. Accordingly, the computer system can generate a prompt to investigate the feature, such as: to inform tightening upstream tolerances to trigger assembly units with the first feature to be discarded or sent for rework earlier during assembly; or to inform changing an upstream manufacturing input or process on the assembly line to reduce frequency of assembly units with a value of the first feature that falls within the second value range. The computer system can then serve (or "push") this prompt to the user, such as via a user portal accessible via a mobile, laptop, or desktop device onsite or remote from the assembly line.

5.2 High Completion Rate With High Final Pass Rate

In another implementation, if both the completion rate for the assembly line and the final pass rate for the assembly unit are high (e.g., >98%), overall yield from the assembly line is high but may be the result of insufficient tolerances or testing of assembly units during manufacture such that risk of field failure is high. More specifically, high completion rate and high final pass rate without validation of low field failure rate may indicate insufficient testing and/or loose tolerances that result in defective assembly units passing intermediate and final tests.

Therefore, during a "high final pass rate cycle," the computer system can retrieve or aggregate visual and non-visual features collected during assembly of a population of assembly units completed on the assembly line. For each assembly unit, the computer system can generate an n-dimensional vector representing all measured or characterized visual and non-visual features of the assembly unit, such as with each feature weighted by its known correlation to a functional failure or aesthetic defect for an assembly type of the assembly unit. The computer system can also: calculate an n-dimension center (or "centroid") of this population of vectors in n-dimensional feature space; identify a first subset of assembly units represented by a vector furthest from the population center; flag this first subset of assembly units as possible outliers and at risk for field failure; and serve a prompt to the user to further investigate these flagged assembly units or initiate more rigorous testing of these assembly units in order to preempt future field failures.

Furthermore, as the computer system executes Blocks of the method described above and below to prompt changes to upstream processes and downstream tolerances to improve yield from the assembly line and maintain low field failure rates, the computer system can continue to execute the "high final pass rate cycle" to regularly guide targeted investigation and testing of select assembly units to re-validate upstream processes and downstream tolerances on the assembly line and to protect against future field failures.

5.3 Low Completion Rate With High Final Pass Rate

In another implementation, if the completion rate for the assembly line is low (e.g., 70%) but the final pass rate for the assembly unit is high (e.g., 98%), an unnecessarily high ratio of assembly units may be failed at an intermediate assembly stage and either discarded or reworked while a high ratio of assembly units that pass this intermediate assembly stage also pass final testing.

Accordingly, the computer system can predict prevalence of two possible root causes for low completion rate and high final pass rate at the assembly line and generate a recommendation for the user accordingly. In particular, the tolerances set for an intermediate test at the intermediate assembly stage may be too tight and may gate (i.e., "prevent") non-defective assembly units from passing to the next assembly stage. Accordingly, the computer system can generate a recommendation to loosen tolerances set for the intermediate test in order to pass more assembly units downstream to a next assembly stage, increase completion rate, increase final pass rate, and increase first-time yield. Conversely, a manufacturing step or input preceding the intermediate assembly stage may be effecting failures at the intermediate assembly stage (e.g., poor process control yielding and poor repeatability of a particular feature or process at an upstream assembly stage). Accordingly, the computer system can recommend investigating and then tightening an upstream processes to reduce failures at the intermediate assembly stage.

In this implementation, the computer system can execute a "low completion rate check" to isolate a particular feature that represents a possible candidate for a) loosening intermediate tolerances to increase downstream completion rate or b) correcting upstream processes to improve completion rate while maintaining high first-time yield.

Additionally or alternatively, in this implementation, the computer system can generate a recommendation to flag and pass a subset of assembly units that marginally failed the intermediate assembly stage. units, downstream through the assembly process to gather additional data on whether it is safe to open the limits. This would be part of facilitating the "investigation" process.

5.3.1 Upstream/Downstream Option Generation

In one implementation, for each assembly unit reaching at least the intermediate assembly stage, the computer system implements methods and techniques described in U.S. patent application Ser. No. 17/202,262 to retrieve or aggregate a corpus of visual and non-visual features representing the assembly unit, such as including: features extracted from images of the assembly unit at assembly stages up to and including the intermediate assembly stage; non-visual test results captured after assembly stages up to and including the intermediate assembly stage; and non-visual manufacturing inputs (e.g., machine or process settings, identifiers of human operators present on the assembly line, component batch numbers, processing times and temperatures, pressures). For each assembly unit reaching at least the intermediate assembly stage, the computer system then: generates an n-dimensional vector representing these visual and non-visual features of the assembly unit; and labels the vector as either passed or failed at the intermediate assembly stage.

The computer system implements regression, k-means clustering, artificial intelligence, and/or other techniques to isolate a first subset of vectors labeled as failing the intermediate assembly stage and to isolate a second subset of vectors labeled as passing the intermediate assembly stage, wherein the first subset of vectors represent a range of values for a particular feature that is disjoint (i.e., nonoverlapping) a range of values for the particular feature in the second subset of vectors.

The computer system then calculates (or "scores") a correlation between the particular feature and failure at the intermediate assembly stage based on distance between values of the particular feature in the first and second groups of vectors. For example, the computer system can: characterize the first density of values of the particular feature within the first subset of vectors; characterize the second density of values of the particular feature within the second subset of vectors; and characterize a distance between the first and second subsets of vectors in the domain of the particular feature. The computer system can then calculate a correlation score for the particular feature and failure at the intermediate stage: proportional to the first density; proportional to the second density; and proportional to the distance between the first and second subsets of vectors in the domain of the particular feature.

5.3.1.1 Low Correlation Score

In this implementation, if the correlation score for the particular feature and failure at the intermediate stage is low (e.g., less than .i), assembly units represented by the first and second subsets of vectors may exhibit strong similarity in the domain of the particular feature and may only differ within a narrow quantitative range within the domain of the particular feature. Accordingly, the particular feature (or a location, test, component, process, operator, or assembly stage, etc. linked to the particular feature in a feature map, as shown in FIG. 5) may be a candidate for loosening tolerances to enable more assembly units—with values of the particular feature spanning a (slightly) wider value range—to pass downstream to a next assembly stage.

Generally, in this implementation, the computer system can select the particular feature from a set of features explicitly assigned a tolerance check at or before the intermediate assembly stage. Accordingly, if the correlation score between the particular feature and failure at the intermediate assembly stage is low, the computer system can: predict or identify a particular tolerance linked to the particular feature as unnecessarily failing assembly units at the intermediate assembly stage; generate a prompt to loosen this particular tolerance; and serve this prompt to the user.

Additionally or alternatively, if the correlation score between the particular feature and failure at the intermediate assembly stage is low, the computer system can: predict that a particular test—such as with specified tolerance—linked to the particular feature is unneeded on the assembly line; generate a prompt to eliminate this particular test at the intermediate assembly state; and serve this prompt to the user. Similarly, if a correlation score between the particular feature—associated with a particular upstream test—and all functional tests downstream of this particular upstream test is low, the computer system can: generate a prompt to eliminate the particular upstream test from the intermediate assembly state; and serve this prompt to the user.

In this implementation, the computer system can also generate a recommendation for revised or expanded limits for the particular tolerance. For example, the computer system can calculate a new tolerance characterized by a smallest change from the current tolerance and that would pass and fail a different combination of the historical assembly units (i.e., pass more and fail fewer of the same assembly units) such that correlation between the particular feature and failure at the intermediate stage (or anywhere on assembly line) increases to achieve a predicted first-time yield or field failure rate that matches target production metrics set by the user. The computer system can then serve this recommendation to the user.

Alternatively, in this implementation, the computer system can select the particular feature from a set of features not explicitly linked to a location, test, component, process, operator, or assembly stage, etc. assigned a tolerance check at or before the intermediate assembly stage. Accordingly, the computer system can: implement methods and techniques described in U.S. patent application Ser. No. 17/461, 773 to generate a feature map representing spatial and temporal connections between visual and non-visual features, processing conditions, scheduled tests, and component and assembly tolerances, etc.; and query the feature map for a test result or tolerance mapped to the particular feature. If the feature map returns a scheduled test, the computer system can link the particular feature to the scheduled test; and generate a prompt to investigate the scheduled test for opportunity to loosen testing tolerances and thus pass more assembly units downstream without decreasing first-time yield or increasing field failure rate. In this example, if the feature map returns a region, component, or sub-assembly of the assembly unit associated with a processing condition, the computer system can: link the particular feature to the processing condition; and generate a prompt to investigate the processing condition for opportunity to loosen processing tolerances and thus pass more assembly units downstream without decreasing first-time yield or increasing field failure rate. Furthermore, in this example, if the feature map returns a region, component, or sub-assembly of the assembly unit associated with a dimensional tolerance, the computer system can: link the particular feature to the dimensional tolerance; and generate a prompt to investigate loosening the dimensional tolerance for opportunity to pass more assembly units downstream without decreasing yield or increasing field failure rate. In this example, the computer system can also implement methods and techniques described above to generate a recommendation for a revised tolerance or a magnitude increase in tolerance for the test result, processing condition, or dimensional tolerance, etc.

5.3.1.2 High Correlation Score

Conversely, in this implementation, if the correlation score for the particular feature and failure at the intermediate stage is high (e.g., greater than 0.9), failed assembly units represented by the first subset of vectors may exhibit strong similarity in the domain of the particular feature; passed assembly units represented by the second subset of vectors may exhibit strong similarity in the domain of the particular feature; and the first and second subsets of vectors may exhibit strong dissimilarity in the domain of the particular feature and may differ within a wide quantitative range within the domain of the particular feature. Accordingly, the particular feature may be a candidate for correcting upstream processes to reduce frequency of assembly units that exhibit the particular feature within the range of values represented in the first subset of failed assembly units.

Therefore, the computer system can query the feature map for a location, component, process, operator, or assembly stage, etc. associated or correlated with the particular feature; generate a prompt to investigate this location, component, process, operator, or assembly stage, etc. for upstream opportunities to correct the particular feature by the intermediate assembly stage; and serve this prompt to the user.

5.4.1.3 Multiple Features

Furthermore, the computer system can execute the foregoing process concurrently for multiple visual and/or non-visual features of assembly units that passed and failed at the intermediate assembly stage. The computer system can also: rank these features by highest and lowest correlation scores, which represent best opportunities for upstream correction and tolerance loosening, respectively; generate prompts for upstream investigations and/or tolerance loosening opportunities to pass more assembly units downstream; and serve these prompts—sorted by ranks of their corresponding features—to the user.

5.4 Low Completion Rate With Low Final Pass Rate

In yet another implementation, if the completion rate for the assembly line is low (e.g., 70%) and the final pass rate for the assembly unit is low (e.g., 75%), a high ratio of assembly units fail at an intermediate assembly stage, and a high ratio of assembly units that pass the intermediate assembly stage also fail final testing. Accordingly, the computer system can predict prevalence of multiple possible root causes for low completion rate and low final pass rate at the assembly line, such as including: correct limits for prescribed tolerances but poor manufacturing control over the entire assembly line; incorrect limits for prescribed tolerances for intermediate tests but correct final test limits (which may lead to defective assembly units reaching completion and correct assembly units being discarded); incorrect limits for prescribed tolerances for final tests but correct intermediate test limits; etc.

Therefore, the computer system can execute both low final pass rate and low completion rate checks, as described above, to predict root cause for low completion rate and low final pass rate. For example, the computer system can: execute methods and techniques described in U.S. patent application Ser. Nos. 17/202,262 and 17/461,773 to identify a first set of features correlated with low completion rate and low final pass rate in order to address poor manufacturing control as root cause; execute a low final pass rate cycle in order to identify a second set of features correlated with incorrect limits for prescribed tolerances at an intermediate assembly stage; and execute a low completion rate cycle in order to identify a third set of features correlated with incorrect limits for prescribed tolerances for final tests. The computer system can then: sort or rank these features and corresponding tolerances or upstream processes; generate prompts to initiate targeted investigations into these tolerances or upstream processes; and serve these prompts to the user to guide the user in executing targeted adjustments to limits and processes on the assembly line and thus improve first-time and overall yield.

5.5 Fusion

The computer system can execute the foregoing checks and cycles described above simultaneously for all discrete tests occurring along the assembly line and on completed assembly units produced on the assembly line, thereby informing targeted adjustments to limits and processes on the assembly line to thus improve first-time and overall yield.

6. Longer-Term Feedback With Field Failure Data

Later, once a population of assembly units have been completed on the assembly line and shipped (e.g., sold to customers, deployed by end users), customers and/or end users may return assembly units due to functional failures and aesthetic defects, the computer system (or the database) can store and aggregate these field failure data for individual assembly units completed on the assembly line.

Accordingly, the computer system can access field failure data, such as in the form of a "field failure list" of serial numbers or other unique identifiers of returned assembly units labeled with verified functional failure types and/or aesthetic defects. The computer system can then: retrieve stored manufacturing data for the assembly units identified in the field failure list; and implement methods and techniques described in U.S. patent application Ser. No. 17/202, 262 to identify visual features correlated with functional failure types and/or aesthetic defects within these returned assembly units. The computer system can similarly implement methods and techniques described in U.S. patent application Ser. No. 17/461,773 to identify non-visual features correlated with functional failure types and/or aesthetic defects within these returned assembly units.

6.1 High Completion Rate, High Final Pass Rate, Low Field Failure

In one implementation, if the completion rate and final pass rates for the assembly line are high (e.g., >98%) and if the field failure rate for assembly units produced on the assembly line is low (e.g., <0.1%), limits for prescribed tolerances for intermediate and final tests on the assembly line may be both repeatably achieved and unnecessarily tight. Therefore, the computer system can: predict opportunity to loosen a tolerance (i.e., expand a limit for a tolerance) in order to reduce manufacturing costs; and execute methods and techniques described above to identify a particular tolerance to investigate for limit adjustment.

In one example, the computer system implements methods and techniques described above to access or generate a corpus of vectors, each: representing visual and/or nonvisual features of assembly units partially of fully completed on the assembly line; and labeled with intermediate results (e.g., passed or failed a particular intermediate test), final results (e.g., passed or failed a final test before shipment), and field results (e.g., not returned or field failure type). The computer system then: implements methods and techniques described in U.S. patent spplication Ser. Nos. 17/202,262 and 17/461, 773 to derive (or "score") correlation scores for visual and/or non-visual features and intermediate, final, and field failures; retrieves a set of tolerances specified for intermediate and final assembly stages for the type of the assembly unit; and implements the feature map to link these tolerances to groups of visual and nonvisual features represented in the corpus of vectors, and a manufacturing process related to (or that "touches," "affects") the tolerance. For each tolerance in this set, the computer system then calculates a composite score (e.g., a sum, a linear combination) of correlation scores between intermediate, final, and field failures of assembly units and the group features linked to the tolerance. The computer system then prompts the user to investigate a tolerance—associated with a lowest composite score in this set—for opportunity to loosen the tolerance, relax the related manufacturing process, and thus reduce manufacturing cost. Alternatively, the computer system can serve a list of tolerances—ranked by composite score—for opportunity to loosen the tolerance, relax the related manufacturing processes, and thus reduce manufacturing cost.

Additionally or alternatively, in this variation, because a particular tolerance in this set associated with a highest rank may exhibit poorest correlation to field failure, the computer system can implement similar methods and techniques to generate a recommendation to investigate removing a test for the particular tolerance entirely from the assembly line.

6.2 Low Completion Rate, High Final Pass Rate, Low Field Failure

In another implementation, if the completion rate is low, the final pass rate is high, and the field failure rate is low, the computer system can verify that the high final pass rate is not due to missed failures of completed assembly units. However, the computer system can also interpret the combination of low field failure rate with low completion rate as: indicating that tolerances for intermediate tests on the assembly line are unnecessarily tight; indicating that correct (i.e., non-defective) assembly units are unnecessarily discarded (or sent for rework) at the intermediate assembly stage rather than pass (directly) to completion; and indicating opportunity to loosen tolerances at the intermediate assembly stage in order to reduce manufacturing costs.

For example, the computer system can execute a low completion rate cycle described above to either: identify an opportunity to loosen a tolerance that has failed assembly units at an intermediate assembly stage historically; or prompt investigation into location, component, process, operator, or assembly stage, etc. for upstream opportunities to achieve this tolerance more repeatably at this intermediate assembly stage.

6.3 High Yield and High Field Failure

In another implementation, if the yield rate is high (e.g., >98%) but the field failure rate is also high (e.g., >1%), the computer system can predict that tightening an intermediate and/or a final tolerance for assembly units produced on the assembly line will better catch defective assembly units, reduce field failure rates, reduce resource investment in defective assembly units, and/or enable more effective rework of defective assembly units.

In one example, the computer system can implement methods and techniques described above to access or generate a corpus of vectors, each: representing visual and/or nonvisual features of assembly units partially- or fully-completed on the assembly line; and labeled with interme-
diate results (e.g., passed or failed a particular intermediate
test), final results (e.g., passed or failed a final test before
shipment), and field results (e.g., not returned or field failure
type). The computer system can then: implement methods
and techniques described in U.S. patent application Ser. Nos.
17/202,262 and 17/461,773 to derive correlation scores
between visual and/or non-visual features and field failures;
retrieve a set of tolerances specified for intermediate and
final assembly stages for the type of the assembly unit; and
implement the feature map to link the set of tolerances to
groups of visual and nonvisual features represented in the
corpus of vectors. Then, for each tolerance in this set, the
computer system can calculate a composite score (e.g., a
sum, a linear combination) of correlation scores between
failure of an assembly unit and features linked to the
tolerance. The computer system can then: prompt the user to
investigate a tolerance—associated with a highest composite
score—for opportunity to tighten the tolerance and thus
reduce field failures; or serve a list of tolerances—ranked by
composite score—for opportunity to tighten tolerances and
thus reduce field failures.

Additionally or alternatively, the computer system can:
implement methods and techniques described in U.S. patent
application Ser. No. 17/202,262 to identify a particular
feature correlated with field failure but not mapped to a
tolerance defined for an intermediate assembly stage for the
type of assembly unit; and generate a recommendation to
define a new tolerance for the particular feature. For
example, for a visual feature correlated with field failure, but
not linked to a final tolerance assigned to the type of
assembly unit in the feature map, the computer system can:
retrieve an image of an assembly unit at an assembly stage
in which the visual feature is visible; highlight (e.g.,
encircle, shadow) the visual feature in the image; and
present the image to the user with a prompt to define a new
tolerance related to the feature.

6.4 Other After-Line Data

In one variation, the computer system can implement
similar methods and techniques to store and aggregate other
after-line data for individual assembly units completed on
the assembly line, such as pre- or non-failure field data
captured and returned directly by these assembly units or by
other IOT devices interfacing or deployed with these assem-
bly units. The computer system can then execute the fore-
going methods and techniques based on these after-line, pre-
or non-failure field data, such as instead of or in addition to
field failure data as described above.

7. Upstream Visual Limit Reduction for Reduced Defective Assembly Unit Resource Allocation As described above, one variation of the method includes,
for each assembly unit in a historical population of assembly
units assembled on an assembly line during a first time
period and tested according to a target test following a target
assembly stage on the assembly line: accessing feature
values, of a corpus of visual features, extracted from a set of
images of the assembly unit, the set of images captured by
a set of optical inspection stations arranged on the assembly
line upstream of the target test in Block S110; and accessing
a failure status (and/or test data) of the assembly unit at the
target test in Block S112.

The method also includes, for each visual feature, in the
corpus of visual features: deriving a correlation between feature values, of the visual feature, and failure status
(and/or test result) at the target test in Block S120; deriving
an effective limit of the visual feature based on scope of
feature values, of the visual feature, in the historical popu-
lation of assembly units in Block S122; and calculating an
action score for the visual feature in Block Si3o proportional
to the correlation and a width of the effective limit of the
visual feature.

The method further includes: selecting a particular visual
feature, from the corpus of visual features, based on a
particular action score of the particular visual feature in
Block S140; and generating a prompt—in Block S150—to
a) insert a preemptive test for the particular visual feature
upstream of the target assembly stage during a second time
period succeeding the first time period and b) assign a target
limit, narrower than an effective limit of the particular visual
feature, to the preemptive test; and serving the prompt to a
user affiliated with the assembly line in Block Si6o.

Generally, in this variation, the computer system can:
generate a prompt to a) insert a preemptive test for a
particular visual feature upstream of a target assembly stage
during an upcoming time period at the assembly line and b)
assign a target limit, narrower than an effective limit of the
particular visual feature during a historical time period, to
the preemptive test; and serve the prompt to a user affiliated
with the assembly line. Additionally or alternatively, the
computer system can automatically define and deploy a new
preemptive test upstream of the target test, such as based on
a feature associated with a greatest action score exceeding a
threshold action score.

In particular, in this variation, the computer system can
detect and characterize options for tightening upstream
tolerance limits on particular features in order to reduce
resource allocation (e.g., operator assembly time, installa-
tion and assembly of components) to assembly units that
will fail later functions tests on the assembly line (and/or that
will fail in the field). More specifically, if a failure rate
among historical assembly units at a target test on the
assembly line is high, the computer system can predict new
or narrower limits of a particular upstream feature that flag
future assembly units—likely to be found defective later by
the target test—for preemptive rework or discard, thereby
reducing resource allocation to these defection units.

7.1 Target Test Selection

Generally, the computer system can execute Blocks of the
method to automatically select a target test—from a set of
tests defined along the assembly line—exhibiting a high(est)
failure rate within the historical population of assembly
units. Alternatively, the computer system can prompt the
user to select the target test from this set of tests.

For example, for each test in the set of tests defined along
the assembly line, the computer system can access a his-
torical line failure rate of assembly units that failed the test
following completion of a corresponding assembly stage, in
a sequence of assembly stages, on the assembly line during
a historical (e.g., recent) time period. The computer system
can then select the target test, from the set of tests, based on
a target historical line failure rate of the target test exceeding
historical line failure rates of other tests in the set of tests.

In a similar example, the computer system can: access a
line failure rate at the target test within the historical
population of assembly units; and access a field failure rate
of the historical population of assembly units. Then, in
response to the line failure rate exceeding a threshold line
failure rate and, in response to the field failure rate exceeding a threshold field failure rate, the computer system can select the target test for augmentation with a preemptive test in order to reduce resource allocation—upstream of the target test—for assembling assembly units that would otherwise be found defective downstream at the target test.

In one implementation, the computer system selects a target test that includes a functional test on a functional process of assembly units—assembled on the assembly line—following completion of a target assembly stage. Accordingly, the computer system can execute Blocks of the method to: select a particular visual feature—upstream of the target assembly stage and the target test—represented by a physical dimension and/or geometry; and generate a prompt to filter assembly units—exhibiting dimensional and/or geometric characteristics that predict functional failure at the target test—from the assembly line prior to the target assembly stage by narrowing an effective dimensional and/or geometric tolerance limit of the particular visual feature.

7.2 Feature Aggregation

As shown in FIGS. 1, 2B, and 5, the computer system can then retrieve, select, identify, and/or aggregate visual features detected in the historical population of assembly units upstream of the target test and/or the target assembly stage. In particular, the computer system implement methods and techniques described in U.S. patent application Ser. Nos. 15/407,158, 15/953,206, and/or 16/506,905 to: retrieve images representing the historical population of assembly units at various states of assembly and captured by optical inspection stations arranged along the assembly line upstream of the target test; implement feature detection and extraction models to detect like clusters of feature types in each assembly unit at each of these upstream assembly states; and aggregate features detected in each assembly unit at each of these upstream assembly states into a feature container specific to each assembly unit.

The computer system can then select all or a subset of these features for generation or refinement of tolerance limits. More specifically, a subset of these features may have been assigned tolerance limits (e.g., dimensional or geometric limits) during the preceding assembly period; and the computer system may have implemented methods and techniques described in U.S. patent application Ser. Nos. 15/407,158, 15/953,206, and/or 16/506,905 to selectively pass or fail these assembly units based on these predefined tolerance limits and feature dimensions or geometries extracted from images of the assembly units captured by the set of optical inspection stations. Therefore, the computer system can execute Blocks of the method to selectively prompt reduction of existing tolerance limits of these features.

Additionally or alternatively, the computer system can select or isolate visual features—not previously associated with a geometric, dimensional, or other tolerance limit—for new tolerance limit assignment upstream of the target test. Accordingly, the computer system can execute Blocks of the method to select a particular visual feature—not associated with an explicit tolerance limit for passing and failing assembly units prior to reaching the target assembly stage on the assembly line during the first time period—for assignment of a new tolerance limit upstream of the target test.

However, the computer system can select or aggregate any other visual feature for verification of new or narrowed tolerance limit assignment.

7.3 Individual Feature Handling: Target Test Result Correlation

The computer system then executes Blocks of the method to calculate an action score—representing efficacy of creating or reducing a tolerance limit for a feature to reduce failures at the target test—for each feature, as shown in FIGS. 1 and 2B.

In one implementation, the computer system then: selects a first feature from the set of features; retrieves or extracts values of the first feature detected in the historical population of assembly units; retrieves target test results across the historical population of assembly units; and implements methods and techniques described in U.S. patent application Ser. Nos. 15/407,158, 15/953,206, and/or 16/506,905 to derive a correlation between the first feature and results of the target test. More specifically, the computer system can derive a strength of correlation between a) feature values in a first value range and failure at the target test and b) feature values in a second, distinct value range and passing the target test.

The computer system can further identify an earliest optical inspection station on the assembly line at which the first feature is detectable in assembly units, which may: function as a proxy for proximity of integration of a first feature into assembly units and a start of the assembly line; and define a target location to insert a preemptive test for the first feature to reduce downstream failure frequency at the target test. For example, the computer system can identify a particular optical inspection station, in the set of optical inspection stations, that captured an earliest image—in the set of images of the historical population of assembly units—depicting an instance of the first feature in an assembly unit in the historical population of assembly units.

7.4 Individual Feature Handling: Historical Limits

The computer system then derives an effective limit of the first feature based on scope of feature values—of the first feature in the historical population of assembly units—that passed the particular optical inspection station and/or that reached the target test. For example, the computer system can: retrieve (quantitative) feature values—of the particular feature—for all historical assembly units that reached the target test; calculate a range of feature values bounded by these feature values; and store this range as an effective limit of the first feature during the corresponding assembly period.

7.5 Individual Feature Handling: Historical Results Given New Limit Reduction The computer system can then characterize effects of reduction of the limit of the first feature on: a) frequency of assembly units that reach and fail the target test; and b) frequency of assembly units that reach and pass the target test. In particular, based on historical assembly data and target test results of the historical population of assembly units, the computer system can calculate a reduction in defective assembly units reaching the target test and a reduction in functional units reaching the target test if narrowed limits for the first feature were applied to the historical population of assembly units.

In one implementation, the computer system: derives a frequency (e.g., quantity, ratio to total assembly units) of historical units—with instances of the feature outside the new limit—that were previously found to be functional but would have been discarded or reworked given a narrower new limit; and stores this frequency of discarded or reworked functional units as a predicted reduction in first-time yield for future assembly units given application of the new limit for the first feature and similar conditions on the assembly line.

In this implementation, the computer system can also derive a frequency of defective historical assembly units: with instances of the feature outside the new limit; that were previously passed to some or all assembly stages between the particular optical inspection station and the target test; and that were found to be defective at the target test. The computer system can represent this frequency of defective historical units as a predicted scope of reduced resource waste during production of future assembly units given application of the new limit for the first feature and similar conditions on the assembly line.

Furthermore, in this implementation, the computer system can estimate a reduction in frequency of earlier assembly steps—performed on historically defective assembly units that eventually failed the later target test—if the new limit was historically applied. More specifically, the computer system can estimate a quantity of instances of each assembly step—between the particular optical inspection station and the target test—that would have been avoided (i.e., not performed) due to earlier discard of defective assembly units resulting from application of the narrowed limit of the first feature.

7.5.1 Individual Feature Handling: Preset Limit Reduction

In one implementation, the computer system executes the foregoing process to calculate reductions in passed and failed assembly units reaching the target test and reductions in resource allocation to defective assembly units given application of tolerance limits reduced by fixed increments. For example, the computer system can calculate changes in pass and fail rates at the target test given 1%, 5%, 10%, and/or 20% reductions in the current tolerance limit of the first feature: with this limit reduction centered around a mean, median, or mode of the range of feature values of the feature that previously passed (implicit or explicit) inspection during each assembly stage; with this limit reduction biases toward the lower bound of the current limit; and/or with this limit reduction biases toward the upper bound of the current limit.

7.5.2 Individual Feature Handling: Limit Reduction by First-time Yield Effect In another implementation FIG. 2B, the computer system calculates a reduced limit for the first feature that would have yielded: a maximum reduction in the failure rate at the target test; and less than a maximum rejection rate of assembly units that would have passed the target test (e.g., 0.5%, 1%, such as set by the operator) within the historical population of assembly units.

In one example, the computer system: increases the lower bound of the original limit for the first feature, such as by 1% of the range of the original limit; quantifies a first reduction in frequency of defective historical assembly units—with instances of the feature outside of the new limit—that would have reached the target test given the new limit; and quantifies a second reduction in frequency of functional historical assembly units—with instances of the feature outside the new limit—that were previously found to be functional but that would have been discarded or reworked given the new limit. Then, if reduction in the first frequency of defective historical units reaching the target test significantly exceeds the second reduction in frequency of functional historical units reaching the target test (e.g., by more than 100:1, by more than an overall failure rate of the assembly line, or by more than the inverse of the current first-time or overall yield rate of the assembly line), the computer system can repeat this process to further increase the lower limit and thus narrow the limit of the first feature.

Otherwise, the computer system implements this process to reduce the upper limit and tighten the limit of the first feature. In particular, the computer system can: reduce the upper bound of the limit of the first feature; quantify a third reduction in frequency of defective historical units—with instances of the feature outside the new limit—that would have reached the target test given the new limit; and quantify a fourth reduction in frequency of functional historical units—with instances of the feature outside the new limit—that were previously found to be functional but would have been discarded or reworked given the new limit. If the third reduction in frequency of defective historical units reaching the target test significantly exceeds the fourth reduction in frequency of functional historical units reaching the target test (e.g., by more than 100:1, by more than an overall failure rate of the assembly line, or by more than the inverse of the current first-time or overall yield rate of the assembly line), the computer system can repeat this process to further reduce the upper limit and thus tighten the limit of the feature.

Otherwise, the computer system can store these new upper and lower bounds as an alternative limit for the first feature.

7.5.3 Individual Feature Handling: Limit Reduction by Target Failure Rate Reduction In a similar implementation shown in FIG. 2B, the computer system prompts the operator to set a target reduction in frequency of defective assembly units (e.g., 10%) reaching the target test and flagged for discard or rework based on results of the target test. The computer system then implements methods and techniques described above to iteratively calculate tighter upper and lower limits of the target feature until the new bounds of the limit would have yielded the target reduction in frequency of defective historical assembly units reaching the target test and flagged for discard or rework.

For example, the computer system can interactively raise the lower bound of the limit and lower the upper bound of the limit until the frequency of historical assembly units that would have reached and failed the target test is reduced by the actual frequency in the historical population of assembly units by the target reduction.

The computer system can store these new upper and lower bounds as an alternative limit for the first feature.

The computer system can further implement methods and techniques described above to calculate a reduction in frequency of uses that would have reached and passed the target test—and therefore a reduction in first-time yield—given application of this target limit for the first feature in the historical population of assembly units.

7.5.4 Individual Feature Handling: Future Yield and Resource Prediction

Therefore, the computer system can: calculate reduction in frequency of past defective assembly units that would have reached the target test given historical application of reduced limits of the first feature; and calculate reduction in frequency of past functional limits that would have reached the target test (or that would have been completed on the assembly line) given application of this reduction in limits of the feature.

Thus, given similar conditions on the assembly line in the future, the new limit of the first feature predicts similar results on the assembly line, including: a future frequency of defective units reaching the target test; and a future frequency of functional limits prevented from reaching the target test (or flagged for rework prior to the target test).

7.6 Individual Feature Handling: Action Score

As shown in FIGS. 1 and 2B, the computer system can then compile the foregoing characteristics and limit calculations of the first feature into an action score for the first feature.

For example, in order to prioritize earliest detection of features that predict failure at the target test, the computer system can calculate an action score for the first feature: proportional to the correlation between the first feature and results at the target test; proportional to proximity of introduction of the feature to the start of the assembly line; and/or proportional to proximity of a particular optical inspection station configured to first detect the first feature to the start of the assembly line).

Additionally or alternatively, because a wider original limit may exhibit greater options for reducing or tightening the limit to reduce frequency of defective assembly units reaching the target test while not reducing first-time yield, the computer system can calculate the action score for the first feature proportional to a width of the original limit for the first feature.

In one variation, the computer system calculates the action score for the first feature further proportional to a maximum reduction in frequency of defective units reaching the target test before the first-time yield on the assembly line diminishes by more than a threshold (e.g., 1%) or drops below a minimum first-time yield (e.g., 99%, such as set by the user).

Additionally or alternatively, the computer system can calculate the action score for the first feature further proportional to a maximum reduction in resources (e.g., labor, components) allocated to defective units reaching the target test before the first-time yield on the assembly line diminishes by more than the threshold or drops below a minimum first-time yield set for the assembly line.

For example, the computer system can implement methods and techniques described above to calculate an alternative limit that: isolates a first frequency of assembly units, in the historical population of assembly units, that failed the target test and exhibit feature values of the particular visual feature outside of the target limit; isolates a second frequency—less than a threshold frequency—of assembly units, in the historical population of assembly units, that passed the target test and exhibit feature values of the particular visual feature outside of the alternative limit; and releases a third frequency of assembly units, in the historical population of assembly units, that passed the target test and exhibit feature values of the particular visual feature within the alternative limit. In this example, the computer system can also: access a historical first-time yield for the historical population of assembly units (e.g., 91%); access a target minimum first-time yield set for the assembly line (e.g., 90%); and set the threshold frequency less than a difference between the historical first-time yield and the target minimum first-time yield (e.g., less than 1%). Thus, in this example, the computer system can constrain reduction of the limit of the first feature—and thus reduction in frequency of defective units reaching the target test—based on historical and minimum first-time yield metrics for the assembly line. Accordingly, application of the narrowed limit upstream of the target test may reduce further investment in defective assembly units while maintaining first-time yield above the minimum first-time yield set for the assembly line.

Additionally or alternatively, the computer system calculates the action score for the first feature: proportional to a reduction in frequency of defective units reaching the target test given a nominal (e.g., 1%) reduction in the limit of the first feature; proportional to reduction in resources (e.g., labor, components) allocated to defective units reaching the target test given the nominal reduction in the limit of the first feature; and/or inversely proportional to a rate of functional assembly units reaching the target test given the nominal reduction in the limit of the first feature.

(In one variation, the computer system: implements methods and techniques described above to characterize effects of multiple alternative limits for the first feature, such as 1%, 2%, 5%, 10%, and 20% limit reductions biased toward the lower bound, center, and upper bound of the original limit; and calculates an action score for each of these alternative limits for the first feature.)

However, the computer system can calculate the action score for the first feature based on any other characteristic or metric associated with the first feature or the corresponding limit.

7.7 Other Features

The computer system can further repeat the foregoing processes to calculate an alternative limit (or a set of alternative limits) and an action score for each other feature in the set of features preceding the target test.

7.8 Feature Ranking and Presentation

Figure 4:
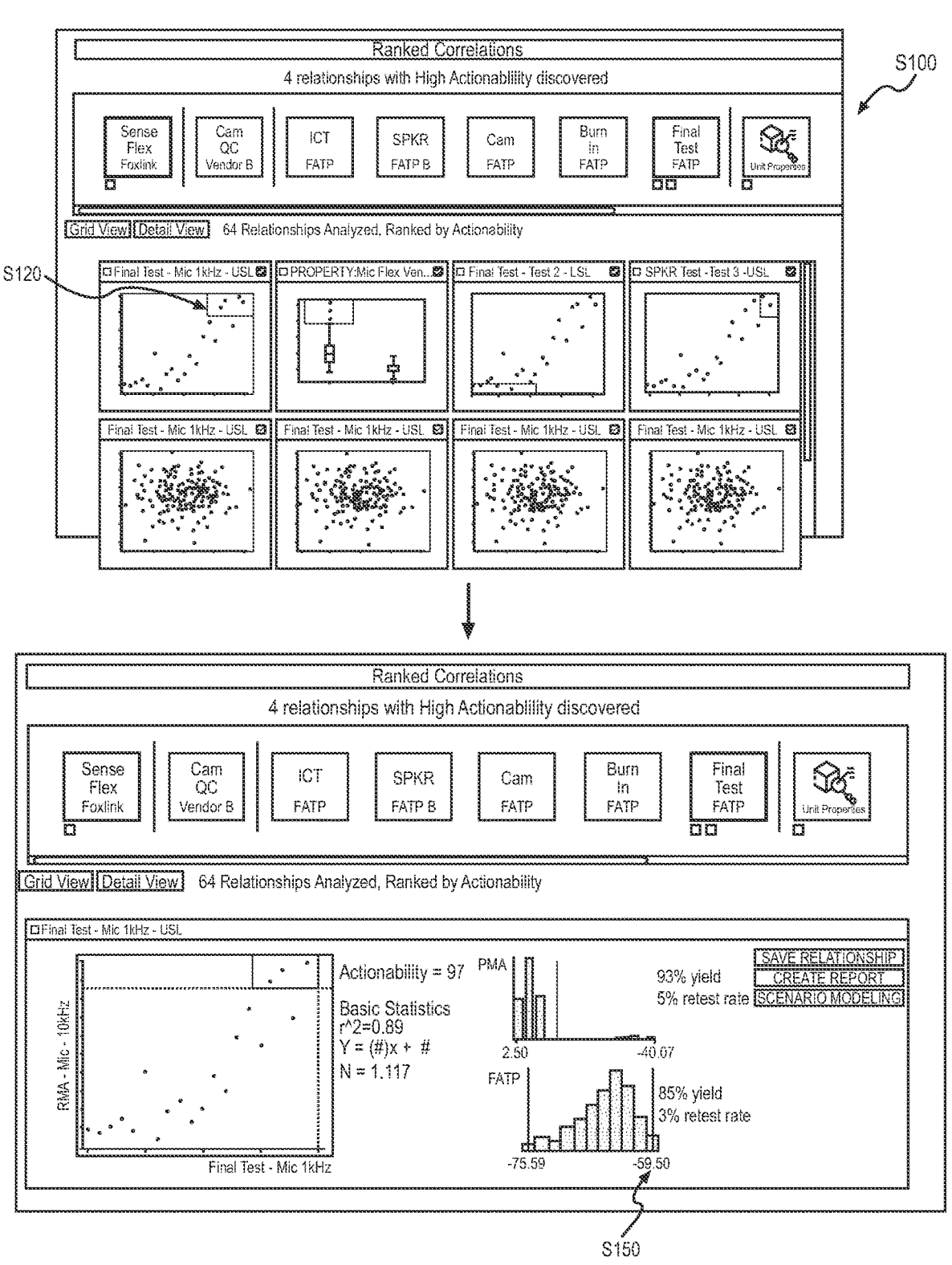
FIG. 4 is a graphical representation of one variation of the method.

The computer system then: ranks the first set of features (or feature and alternative limit combination) by action score; and presents these features (or feature and alternative limit combinations) to the user in order of action score, such as within a table or list rendered in the user portal described above and as shown in FIG. 4.

Furthermore, the computer system can present predicted reductions in frequency of defective assembly units reaching the target test, predicted reductions in resource allocation to defective assembly units upstream of the target test, reduction in function units reaching the target test, and/or reduction in first-time yield during a future assembly period resulting from application of these alterative limits to these features. For example, the computer system can present or highlight: a particular alternative limit for a particular feature predicted to yield a maximum reduction in upstream resource allocation and less than a maximum reduction in first-time yield (e.g., less than 1%) on the assembly line; and/or a particular alternative limit for a particular feature predicted to yield a target reduction in upstream resource allocation set by the user and the corresponding predicted reduction in first-time yield.

7.9 New Target Limit

Figure 3:
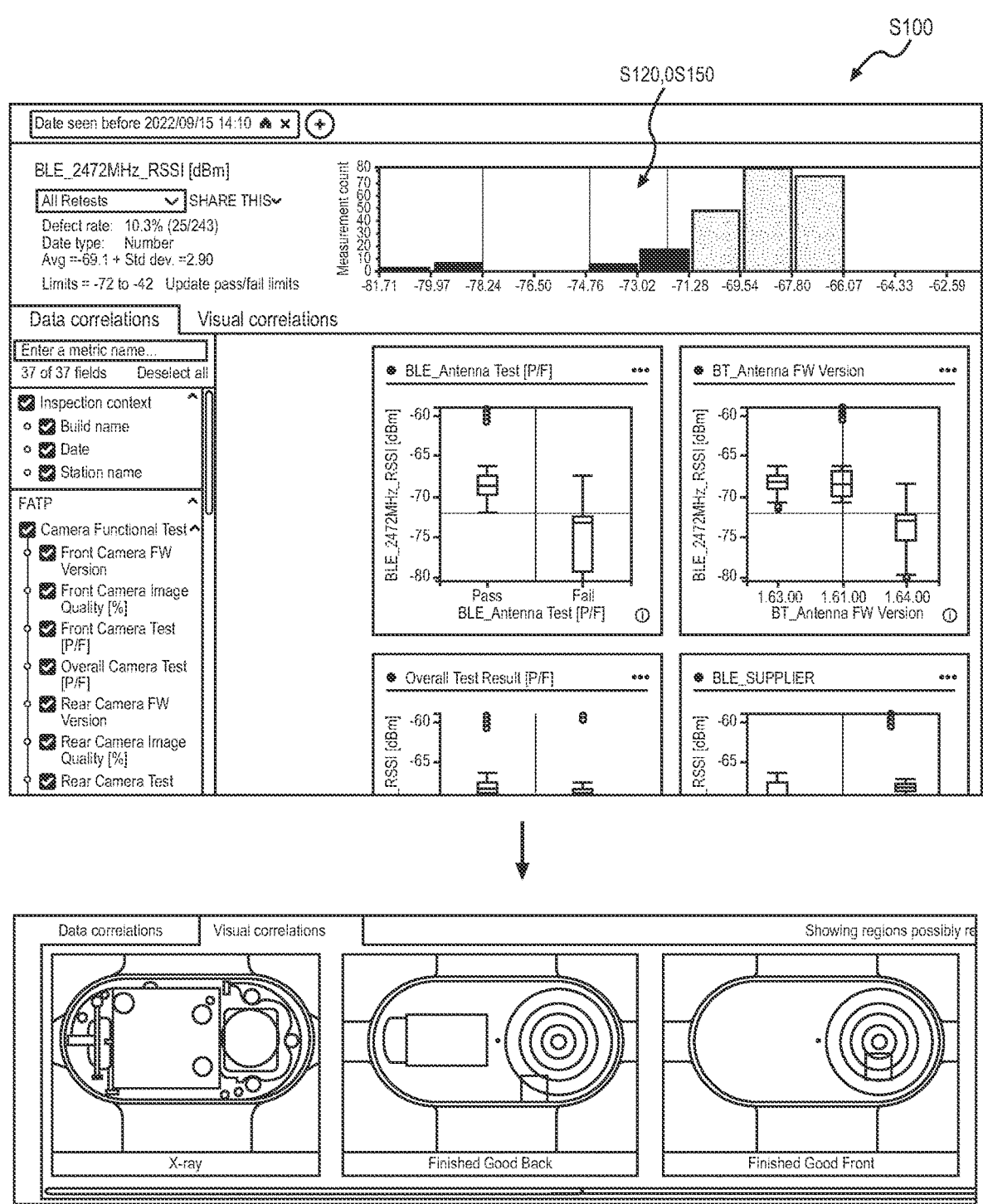
FIG. 3 is a graphical representation of one variation of the method.

As shown in FIGS. 2B and 3, the computer system then: automatically selects a particular feature from the set (or prompts the user to select a particular feature from this set); defines a new or revised preemptive test for the particular feature upstream of the target assembly stage during an upcoming assembly period at the assembly line; assigns a target limit—narrower than the original effective limit of the particular visual feature—to the preemptive test; and prompts the user to confirm or insert the preemptive test on the assembly line, such as at a particular optical inspection station configured to capture images first depicting the particular feature in assembly units assembled on the assembly line.

In one implementation, the computer system: presents a subset of visual features—in the corpus of visual features representing assembly units assembled on the assembly line—ranked by action score to the user; prompts the user to select from the subset of visual features; and receives selection of the particular visual feature—such as corresponding to a greatest action score in the corpus of visual features or corresponding to a high action score and a hypothesis for a critical defect source—from the user. Alternatively, the computer system can automatically select the particular visual feature corresponding to a greatest action score in the corpus of visual features.

Accordingly, the computer system can: present the particular feature and the corresponding target limit to the user for manual configuration and deployment of the target limit at the particular optical inspection station. Alternatively, following confirmation from the user, the computer system can automatically deploy the target limit to the particular optical inspection station, which can then automatically flag assembly units for discard, rework, or further inspection given feature values that fall outside of this target limit, as described in U.S. patent application Ser. No. 15/953,206.

7.91.1 Representative Image

In one variation shown in FIG. 3, the computer system: accesses a representative image captured by the particular optical inspection station and depicting a representative assembly unit in the historical population of assembly units; highlights a representative instance of the particular visual feature in the representative image; and presents the representative image to the user with the prompt to deploy the target limit for the particular feature (e.g., in the form a preemptive test at the particular optical inspection station).

In a similar example, the computer system: accesses a first representative image captured by the particular optical inspection station and depicting a first representative assembly unit in the historical population of assembly units, the first representative assembly unit exhibiting a first feature value of the particular visual feature within the target limit; and highlights a first representative instance of the particular visual feature in the first representative image. In this example, the computer system further: accesses a second representative image captured by the particular optical inspection station and depicting a second representative assembly unit in the historical population of assembly units, the second representative assembly unit exhibiting a second feature value of the particular visual feature within the target limit; highlights a second representative instance of the particular visual feature in the second representative image; and implements methods and techniques described in U.S. patent application Ser. No. 15/407,158 to virtually align a first region of the first image depicting the first representative instance of the particular visual feature in the first assembly unit to a second region of the second image depicting the second representative instance of the particular visual feature in the second assembly unit. The computer system then renders these representative images with the prompt, such as including toggling between rendering the first representative image and the second representative image, aligned to the first representative image, in the user portal.

7.9.2 Target/Alternative Limit

In one implementation shown in FIGS. 1 and 2B, based on feature values and failure statuses of the historical population of assembly units, the computer system implements methods and techniques described above to calculate an alternative (or "target") limit: that isolates a first frequency of assembly units, in the historical population of assembly units, that failed the target test and exhibit feature values of the particular visual feature outside of the target limit; isolates a second frequency of assembly units, in the historical population of assembly units, that passed the target test and exhibit feature values of the particular visual feature outside of the alternative limit, the second frequency less than a threshold frequency; and releases a third frequency of assembly units, in the historical population of assembly units, that passed the target test and exhibit feature values of the particular visual feature within the alternative limit. The computer system then assigns this target limit to the new preemptive test for the particular feature.

In another implementation, the computer system: selects a first preemptive test limit narrower than the original (i.e., current effective) limit of the particular visual feature; calculates a first frequency of assembly units, in the historical population of assembly units, that failed the target test and exhibit feature values of the particular visual feature outside of the first preemptive test limit; calculates a first reduction in first-time yield at the assembly line during the first time period responsive to implementation of the first preemptive test limit for the particular visual feature based on a second frequency of assembly units, in the historical population of assembly units, that passed the target test and exhibit feature values of the particular visual feature outside of the first preemptive test limit; selects a second preemptive test limit narrower than the first preemptive test limit and the effective limit of the particular visual feature; calculates a third frequency of assembly units, in the historical population of assembly units, that failed the target test and exhibit feature values of the particular visual feature outside of the second preemptive test limit; and calculates a second reduction in first-time yield at the assembly line during the second time period responsive to implementation of the second preemptive test limit for the particular visual feature based on a fourth frequency of assembly units, in the historical population of assembly units, that passed the target test and exhibit feature values of the particular visual feature outside of the second preemptive test limit. The computer system then presents the first preemptive test limit with the first frequency and the first reduction in first-time yield to the user; presents the second preemptive test limit with the third frequency and the second reduction in first-time yield to the user; and prompts the user to select the target limit from the first test limit and the second test limit.

In another implementation, the computer system calculates an alternative limit that: isolates a first frequency of assembly units, in the historical population of assembly units, that failed the target test and exhibit feature values of the particular visual feature outside of the target limit; isolates a second frequency of assembly units, in the historical population of assembly units, that passed the target test and exhibit feature values of the particular visual feature outside of the alternative limit, the second frequency less than a threshold frequency; and releases a third frequency of assembly units, in the historical population of assembly units, that passed the target test and exhibit feature values of the particular visual feature within the alternative limit. The computer system then generates a prompt to assign the target limit—between the effective limit of the particular visual feature and an alternative limit calculated for the particular visual feature—to the preemptive test.

7.9.3 Preemptive Test Implementation

As shown in FIG. 2B, the computer system then deploys the preemptive test at (or near) the particular optical inspection station.

In one implementation, the computer system: accesses a first image, of a first assembly unit, captured by the particular optical inspection station during a subsequent assembly period; and extracts a first feature value of the particular visual feature from the first image. Then, in response to the first feature value falling within the target limit of the preemptive test, the computer system (or the particular optical inspection station, etc.) generates a prompt to release the first assembly unit to a next assembly stage on the assembly line downstream of the optical inspection station.

Similarly, the computer system can: access a second image, of a second assembly unit, captured by the particular optical inspection station during this assembly period; and extract a second feature value of the particular visual feature from the second image. Then, in response to the second feature value falling outside of the target limit of the preemptive test, the computer system (or the particular optical inspection station, etc.) can generate a prompt to flag the second assembly unit for rework prior to reaching the target assembly stage.

7.9 New Limit Experimentation and Validation

In one variation shown in FIG. 2B, the computer system prompts the user: to select or confirm a target limit for the particular feature; and to set an experiment batch size for the preemptive test—that is, a quantity of assembly units on which to apply the new limit for the particular feature during a subsequent assembly period.

The computer system then cooperates with the particular optical inspection station (or other elements on the assembly line) to implement the preemptive test with the target limit for the particular feature for a quantity of assembly units— assembled on the assembly line—equal to the experiment batch size. More specifically, the computer system can deploy target limit to the assembly line, such as by: identifying the particular optical inspection station—on the assembly line—with earliest access to the particular feature in new assembly units; and uploading the target limit for the feature to the optical inspection station. Accordingly, the particular optical inspection station can: detect the particular feature in an image (i.e., visual data) of a new assembly unit; extract a dimension, geometry, or other quantitative value of the particular feature from the image of the new assembly unit; flag the new assembly unit for discard or rework if the dimension, geometry, or other quantitative value of the particular feature on the new assembly unit falls outside of the target limit for the particular feature; and repeat this process for a quantity of assembly units equal to the limit experiment batch size.

The computer system then: calculates a new first-time yield during this assembly period; calculates a frequency of assembly units failing the target test downstream of the preemptive test; and presents these data to the user. If the new first-time yield has not substantively diminished and/or if the frequency of assembly units failing the target test is substantively diminished over the prior assembly period, the computer system can repeat the foregoing process to calculate and implement further narrowing of the target limit assigned to the particular feature.

For example, the computer system can: collect production data from the assembly line; derive actual first-time yield and actual upstream resource allocation during this assembly period given application of the new target limit for the particular feature; calculate a difference in first-time yield and upstream resource allocation for the target limit and the prior (implied and explicit) limit for the particular feature; and present this difference to the user. The computer system can then prompt the user to confirm persistence of the new limit for the feature at the particular optical inspection station. (Alternatively, the computer system can confirm persistence of the new limit for the feature at the optical inspection station or test station if the actual upstream resource allocation for the new limit is reduced from the prior upstream resource allocation with no or limited reduction in first-time yield.)

7.10 Limit Reduction for Reduced Field Failure Rate

In one variation shown in FIG. 2A, the method includes, for each assembly unit in the historical population of assembly units assembled on an assembly line during the first time period and tested according to a target test following a target assembly stage on the assembly line: accessing input values, of a corpus of non-visual inputs, representing inputs into the assembly unit upstream of the target test on the assembly line; and accessing a failure status of the assembly unit at the target test. In this variation, the method further includes, for each non-visual input, in the corpus of non-visual inputs: deriving a correlation between input values, of the non-visual input, in the historical population of assembly units and failure status at the target test; deriving an effective limit of the non-visual input based on scope of input values, of the non-visual input, in the historical population of assembly units; and calculating an action score for the non-visual input proportional to the correlation and a width of the effective limit of the non-visual input. This variation of the method further includes: selecting a non-visual input, from the corpus of non-visual inputs, based on an action score of the non-visual input; generating a prompt to a) insert a preemptive test to modify the non-visual input upstream of the target assembly stage during the time period succeeding the first time period and b) assign a target limit, narrower than an effective limit of the non-visual input, to the preemptive test; and serving the prompt to the user.

In particular, in this variation, the computer system can execute the foregoing methods and techniques to define a preemptive test with a new or refined target test for a particular feature in order to: reduce resource allocation to assembly units that eventually fail in the field (i.e., analogous to assembly units that fail at the target test as described above); while achieving little or no reduction in first-time yield at the assembly line. For example, the computer system can: execute methods and techniques described above to define a first preemptive test with new limits for a first feature to reduce resource allocation to assembly units that fail the target test when limited field failure data is available for assembly units produced on the assembly line; and then execute similar methods and techniques to define a second preemptive test with new limits for a second feature to reduce resource allocation to assembly units that later fail in the field one more extensive field failure data is available for assembly units produced on the assembly line.

Therefore, the computer system can execute this variation of the method to find opportunity to reduce the limits of a particular feature and therefore discard or rework assembly units—that would otherwise eventually fail in the field—during earlier assembly stages and thus reduce field failure rate and reduce resource allocation to field-failed units at the assembly line. More specifically, the computer system can execute Blocks of the method to: identify an earliest visual feature present in an assembly unit and that predicts a field failure; define a new target limit for this feature; and inject a new test on the assembly line to discard or rework assembly units that exhibit feature values that fall outside of this new target limit for this feature.

8. Upstream Limit Expansion for Increased Yield

As shown in FIGS. 1, 2A, and 2C, one variation of the method includes, for each assembly unit in a historical population of assembly units assembled on an assembly line during a first time period: accessing feature values, of a corpus of visual features, extracted from a set of images of the assembly unit, the set of images captured by a set of optical inspection stations arranged on the assembly line in Block S110; and accessing a failure status of the assembly unit in Block S112.

This variation of the method also includes, for each visual feature, in the corpus of visual features: deriving a correlation between feature values, of the visual feature, and failure status within the historical population of assembly units in Block S120; accessing a tolerance limit assigned to the visual feature in Block S122; characterizing a sensitivity of a failure frequency within the historical population of assembly units based on feature values of assembly units falling outside of the tolerance limit assigned to the visual feature in Block S124; and calculating an action score for the visual feature inversely proportional to the correlation and the sensitivity of the failure frequency in Block S130.

This variation of the method further includes: selecting a particular visual feature, from the corpus of visual features, based on a particular action score of the particular visual feature in Block S140; generating a prompt to reduce failure frequency of assembly units assembled on the assembly line by increasing width of a particular tolerance limit of the particular visual feature during a second time period succeeding the first time period in Block S150; and serving the prompt to a user affiliated with the assembly line in Block S160.

Generally, in this variation, the computer system can implement methods and techniques similar to those described above to isolate a particular limit—assigned to a particular feature—that is a candidate for limit expansion to increase first-time yield and/or overall yield with no or limited increase in field failure rate. More specifically, the computer system can: identify poor correlation between a particular upstream feature—currently assigned a tolerance limit—and downstream assembly line test failure or field failure; predict changes in first-time yield, overall yield, and/or field failure rate given application of a widened limit for the particular feature; and prompt the user to expand this limit accordingly.

For example, if the first-time yield and/or the overall yield at the assembly line are low (i.e., if a failure rate at the assembly line is high), the computer system can execute Blocks of the method to identify a particular opportunity to widen a limit for a particular feature and thus pass more assembly units—that were previously found defective but would not actually result in field failures—through to completion on the assembly line and/or to complete these assembly units with less rework.

More specifically, if a current test failure rate at the assembly line exceeds a maximum target assembly line failure rate and/or if a current first-time yield at the assembly line is less than a target minimum first-time yield set by the user, the computer system can implement Blocks of the method to identify a particular feature with limits that triggered assembly unit discard or rework in the historical population of assembly units but that are least likely to correlate with field failures. The computer system can thus automatically identify an opportunity to expand the limits of a particular feature and therefore pass more assembly units to completion on the assembly line—and therefore increase first-time yield and/or overall yield—with no or minimal increase in field failure rate.

8.1 Test Selection

Generally, in this variation, the computer system can: identify each visual and/or non-visual feature in the historical population of assembly units associated with a functional, geometric, dimensional, or other pass/fail test; and retrieve a tolerance limit assigned to each of these tests.

8.2 Sensitivity

As shown in FIG. 2C, the computer system then characterizes a sensitivity of the tolerance limit for each test to failing limits.

In one implementation, the computer system accesses a historical line failure rate within the historical population of assembly units. The computer system then: selects a first feature in the corpus of features; selects a test limit wider than a first tolerance limit assigned to the first feature; calculates a first frequency of assembly units, in the historical population of assembly units, that exhibit feature values of the particular feature within the first test limit; calculates a second frequency of assembly units, in the historical population of assembly units, that exhibit feature values of the particular feature outside of the first test limit; and calculates a new line failure rate for the first feature based on a combination of the first frequency and the second frequency. The computer system then calculates a sensitivity of a failure frequency for the first feature: proportional to a first difference between the new line failure rate and the historical line failure rate; and inversely proportional to a second difference between the test limit and a tolerance limit assigned to the feature.

The computer system then repeats this process for each other feature in the corpus of features associated with a tolerance limit during the past assembly period.

8.3 Action Score

The computer system can then implement methods and techniques described above to calculate an action score for the first feature.

Generally, low sensitivity of failure frequency for a feature may: indicate opportunity for a small increase in assembly units passed by a test for the feature given expansion of the tolerance limit assigned to the test; and thus indicate high selectivity at the test and protection against many defective units passing the test despite a small expansion in the tolerance limit assigned to the test. A feature associated with a low sensitivity of failure frequency may therefore represent a candidate for controlled yield increase through tolerance expansion.

Furthermore, a first assembly unit approaching an end of the assembly line may have consumed more resources than a second assembly unit entering a first assembly stage near a start of the assembly line. Failing the first assembly unit near an end of the assembly line may thereby exhibit greater relative cost than failing the second assembly unit near the start of the assembly line. A feature tested near the end of the assembly line may therefore represent greater opportunity for tolerance expansion that a feature tested near the start of the assembly line.

Therefore, the computer system can calculate an action score for the first feature: inversely proportional to the sensitivity of failure frequency for the first feature; and proportional to proximity of first detection of the first feature—in assembly units—to an end of the assembly line.

The computer system can also: calculate a correlation between the first feature and failure at other tests on the assembly line; and the action score for the first feature inversely proportional to strength of this correlation.

However, the computer system can calculate the action score for the first feature based on any other characteristic of the first feature, the associated test, or the historical population of assembly units.

Additionally or alternatively, if the computer system has further access to field failure data for the historical population of assembly units, the computer system can: access a first frequency of assembly units that were discarded due to feature values outside the tolerance limit of the first feature; access a second frequency of assembly units that were reworked due to feature values outside the tolerance limit of the first feature, were subsequently completed, and did not fail in the field; and/or access a third frequency of assembly units that were not reworked due to feature values outside the tolerance limit of the first feature and did subsequently fail in the field. Accordingly, the computer system can calculate the action score for the first feature: proportional to the first frequency (which may indicate opportunity to avoid total loss of assembly units based on the first feature); inversely proportional to the second frequency (which may indicate efficacy of rework based on the first feature); and proportional to the third frequency (which may indicate correlation between field failure and a different feature).

The computer system can repeat this process for each other feature associated with a test or limit in the historical population of assembly units.

8.4 New Target Limit

The computer system can then implement methods and techniques described above to: present these features ranked by action score to the user; prompt the user to select a particular feature for limit expansion; prompt the user to select or input a target increase in yield from a particular test associated with the particular feature; calculate a new, wider tolerance limit for the particular test that will pass a greater frequency of assembly units based on the target increase in yield; and present a recommendation to the user to expand the tolerance limits for the particular test to this new tolerance limit.

8.5 Upstream Limit Expansion for Increased Yield: Low Field Failure Rate

In the foregoing variation and as shown in FIG. 2A, the computer system can execute the foregoing methods and techniques to recommend a wider tolerance limit for a particular feature a) if the first-time yield and/or overall yield from the assembly line is low and b) if the field failure rate of a historical population of assembly units is also low, which may indicate that an excess frequency of assembly units were discarded or reworked due to unnecessarily tight tolerance limits for at least one feature.

For example, the computer system can: access a line failure rate within the historical population of assembly units; access a field failure rate of the historical population of assembly units; and generate a prompt—to reduce failure frequency of assembly units assembled on the assembly line by increasing width of a particular tolerance limit of a particular feature—in response to the line failure rate exceeding a threshold line failure rate (e.g., 5%) and in response to the field failure rate falling below a threshold field failure rate (e.g., 0.01%).

The computer systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:

for each assembly unit in a historical population of assembly units assembled on an assembly line during a first time period and tested according to a target test following a target assembly stage on the assembly line:

accessing feature values, of a corpus of visual features, extracted from a set of images of the assembly unit, the set of images captured by a set of optical inspection stations arranged on the assembly line upstream of the target test; and accessing a failure status of the assembly unit at the target test;

for each visual feature, in the corpus of visual features:

deriving a correlation between feature values, of the visual feature, and failure status at the target test;

deriving an effective limit of the visual feature based on scope of feature values, of the visual feature, in the historical population of assembly units; and calculating an action score for the visual feature based on:

the correlation; and a width of the effective limit of the visual feature;

selecting a particular visual feature, from the corpus of visual features, based on a particular action score of the particular visual feature;

generating a prompt to:

insert a preemptive test for the particular visual feature upstream of the target assembly stage during a second time period succeeding the first time period; and assign a target limit, narrower than an effective limit of the particular visual feature, to the preemptive test; and serving the prompt to a user affiliated with the assembly line.

2. The method of claim 1:

further comprising selecting the target test comprising a functional test on a functional process of assembly units following completion of the target assembly stage;

wherein selecting the particular visual feature comprises selecting the particular visual feature represented by a physical dimension; and wherein generating the prompt comprises generating the prompt to filter assembly units, exhibiting dimensional characteristics that predict functional failure at the target test, from the assembly line prior to the target assembly stage by narrowing an effective dimensional tolerance limit of the particular visual feature.

3. The method of claim 1, further comprising:

accessing a line failure rate at the target test within the historical population of assembly units;

accessing a field failure rate of the historical population of assembly units; and in response to the line failure rate exceeding a threshold line failure rate, and in response to the field failure rate exceeding a threshold field failure rate, selecting the target test for augmentation with the preemptive test to reduce resource allocation, upstream of the target test, for assembling assembly units found defective downstream at the target test.

4. The method of claim 1:

further comprising identifying a particular optical inspection station, in the set of optical inspection stations, that captured an earliest image, in the set of images, depicting an instance of the particular visual feature in an assembly unit in the historical population of assembly units; and wherein generating the prompt comprises generating the prompt to associate the preemptive test with images of assembly units captured by the particular optical inspection station during the second time period.

5. The method of claim 4, further comprising:

accessing a first image, of a first assembly unit, captured by the particular optical inspection station during the second time period;

extracting a first feature value of the particular visual feature from the first image;

in response to the first feature value falling within the target limit of the preemptive test, generating a prompt to release the first assembly unit to a next assembly stage on the assembly line downstream of the optical inspection station;

accessing a second image, of a second assembly unit, captured by the particular optical inspection station during the second time period;

extracting a second feature value of the particular visual feature from the second image; and in response to the second feature value falling outside of the target limit of the preemptive test, generating a prompt to flag the second assembly unit for rework prior to reaching the target assembly stage.

6. The method of claim 3, further comprising:

accessing a first representative image captured by the particular optical inspection station and depicting a first representative assembly unit in the historical population of assembly units, the first representative assembly unit exhibiting a first feature value of the particular visual feature within the target limit;

highlighting a first representative instance of the particular visual feature in the first representative image;

accessing a second representative image captured by the particular optical inspection station and depicting a second representative assembly unit in the historical population of assembly units, the second representative assembly unit exhibiting a second feature value of the particular visual feature within the target limit;

highlighting a second representative instance of the particular visual feature in the second representative image;

virtually aligning a first region of the first image depicting the first representative instance of the particular visual feature in the first assembly unit to a second region of the second image depicting the second representative instance of the particular visual feature in the second assembly unit; and based on the prompt, toggling between rendering the first representative image and the second representative image, aligned to the first representative image, in a user interface viewed by user.

7. The method of claim 1, wherein selecting the particular visual feature comprises:

presenting a subset of visual features, in the corpus of visual features, ranked by action score to the user;

prompting the user to select from the subset of visual features; and receiving selection of the particular visual feature, corresponding to a greatest action score in the corpus of visual features, from the user.

8. The method of claim 1, further comprising:

for each test in a set of tests defined along the assembly line:

accessing a historical line failure rate of assembly units that failed the test following completion of a corresponding assembly stage, in a sequence of assembly stages, on the assembly line during the first time period; and selecting the target test, from the set of tests, based on a target historical line failure rate of the target test exceeding historical line failure rates of other tests in the set of tests.

9. The method of claim 1, wherein selecting the particular visual feature comprises selecting the particular visual feature not associated with an explicit tolerance limit for passing and failing assembly units prior to reaching the target assembly stage on the assembly line during the first time period.

10. The method of claim 1, wherein calculating an action score for each visual feature comprises, for each visual feature in the corpus of visual features:

identifying an optical inspection station, in the set of optical inspection stations, that captured an earliest image, in the set of images, depicting an instance of the visual feature in an assembly unit in the historical population of assembly units; and calculating an action score for the visual feature proportional to:

a correlation calculated for the visual feature;

a width of an effective limit of the visual feature; and proximity of the optical inspection station to a start of the assembly line.

11. The method of claim 1, further comprising:

for each assembly unit in the historical population of assembly units assembled on an assembly line during the first time period and tested according to a second target test following a second target assembly stage on the assembly line:

accessing input values, of a corpus of non-visual inputs, representing inputs into the assembly unit upstream of the second target test on the assembly line; and accessing a second failure status of the assembly unit at the second target test;

for each non-visual input, in the corpus of non-visual inputs:

deriving a second correlation between input values, of the non-visual input, in the historical population of assembly units and second failure status at the second target test;

deriving a second effective limit of the non-visual input based on scope of input values, of the non-visual input, in the historical population of assembly units; and calculating a second action score for the non-visual input proportional to:

the second correlation; and a second width of the second effective limit of the non-visual input;

selecting a second non-visual input, from the second corpus of non-visual inputs, based on a second action score of the second non-visual input;

generating a second prompt to:

insert a preemptive test to modify the second non-visual input upstream of the second target assembly stage during the second time period succeeding the first time period; and assign a second target limit, narrower than a second effective limit of the second non-visual input, to the second preemptive test; and serving the second prompt to the user.

12. The method of claim 1, further comprising, based on feature values and failure statuses of the historical population of assembly units, calculating the target limit:

that isolates a first frequency of assembly units, in the historical population of assembly units, that failed the target test and exhibit feature values of the particular visual feature outside of the target limit;

isolates a second frequency of assembly units, in the historical population of assembly units, that passed the target test and exhibit feature values of the particular visual feature outside of the alternative limit, the second frequency less than a threshold frequency; and releases a third frequency of assembly units, in the historical population of assembly units, that passed the target test and exhibit feature values of the particular visual feature within the alternative limit.

13. The method of claim 1, further comprising:

selecting a first preemptive test limit narrower than the effective limit of the particular visual feature;

calculating a first frequency of assembly units, in the historical population of assembly units, that failed the target test and exhibit feature values of the particular visual feature outside of the first preemptive test limit;

calculating a first reduction in first-time yield at the assembly line during the first time period responsive to implementation of the first preemptive test limit for the particular visual feature based on a second frequency of assembly units, in the historical population of assembly units, that passed the target test and exhibit feature values of the particular visual feature outside of the first preemptive test limit;

selecting a second preemptive test limit narrower than the first preemptive test limit and the effective limit of the particular visual feature;

calculating a third frequency of assembly units, in the historical population of assembly units, that failed the target test and exhibit feature values of the particular visual feature outside of the second preemptive test limit;

calculating a second reduction in first-time yield at the assembly line during the second time period responsive to implementation of the second preemptive test limit for the particular visual feature based on a fourth frequency of assembly units, in the historical population of assembly units, that passed the target test and exhibit feature values of the particular visual feature outside of the second preemptive test limit;

presenting the first preemptive test limit with the first frequency and the first reduction in first-time yield to the user;

presenting the second preemptive test limit with the third frequency and the second reduction in first-time yield to the user; and prompting the user to select the target limit from the first test limit and the second test limit.

14. The method of claim 1, wherein calculating an action score for each visual feature comprises, for each visual feature in the corpus of visual features:

calculating an alternative limit that:

isolates a first frequency of assembly units, in the historical population of assembly units, that failed the target test and exhibit feature values of the particular visual feature outside of the target limit;

isolates a second frequency of assembly units, in the historical population of assembly units, that passed the target test and exhibit feature values of the particular visual feature outside of the alternative limit, the second frequency less than a threshold frequency; and releases a third frequency of assembly units, in the historical population of assembly units, that passed the target test and exhibit feature values of the particular visual feature within the alternative limit; and calculating an action score for the visual feature further proportional to the first frequency.

15. The method of claim 14, further comprising:

accessing a historical first-time yield for the historical population of assembly units;

accessing a target minimum first-time yield set for the assembly line; and setting the threshold frequency less than a difference between the historical first-time yield and the target minimum first-time yield.

16. The method of claim 14, wherein generating the prompt comprises generating the prompt to assign the target limit, between the effective limit of the particular visual feature and an alternative limit calculated for the particular visual feature, to the preemptive test.

17. A method comprising:

for each assembly unit in a historical population of assembly units assembled on an assembly line during a first time period and tested according to a target test following a target assembly stage on the assembly line:

accessing feature values, of a corpus of features, detected in the assembly unit in a sequence of assembly stages upstream of the target test; and accessing a failure status of the assembly unit at the target test;

for each feature, in the corpus of features:

deriving a correlation between feature values, of the feature, and failure status at the target test;

deriving an effective limit of the feature based on scope of feature values, of the feature, in the historical population of assembly units; and calculating an action score for the feature based on:

the correlation; and a width of the effective limit of the feature;

selecting a particular feature exhibiting a greatest action score in the corpus of features;

defining a preemptive test for the particular feature upstream of the target assembly stage during a second time period succeeding the first time period; and assigning a target limit, narrower than an effective limit of the particular feature, to the preemptive test.

18. A method comprising:

for each assembly unit in a historical population of assembly units assembled on an assembly line during a first time period:

accessing feature values, of a corpus of features, extracted from a set of images of the assembly unit, the set of images captured by a set of optical inspection stations arranged on the assembly line; and accessing a failure status of the assembly unit;

for each feature, in the corpus of features:

deriving a correlation between feature values, of the feature, and failure status within the historical population of assembly units;

accessing a tolerance limit assigned to the feature;

characterizing a sensitivity of a failure frequency within the historical population of assembly units based on feature values of assembly units falling outside of the tolerance limit assigned to the feature;

calculating an action score for the feature based on:

the correlation; and the sensitivity of the failure frequency;

selecting a particular feature, from the corpus of features, based on a particular action score of the particular feature;

generating a prompt to reduce failure frequency of assembly units assembled on the assembly line by increasing width of a particular tolerance limit of the particular feature during a second time period succeeding the first time period; and serving the prompt to a user affiliated with the assembly line.

19. The method of claim 18:

further comprising:

accessing a line failure rate within the historical population of assembly units; and accessing a field failure rate of the historical population of assembly units; and wherein generating a prompt to reduce failure frequency of assembly units assembled on the assembly line comprises generating the prompt in response to the line failure rate exceeding a threshold line failure rate and in response to the field failure rate falling below a threshold field failure rate.

20. The method of claim 18:

further comprising accessing a historical line failure rate within the historical population of assembly units; and wherein characterizing a sensitivity of a failure frequency for each feature in the corpus of features comprises, for each feature in the corpus of features:

selecting a test limit wider than a tolerance limit assigned to the feature;

calculating a first frequency of assembly units, in the historical population of assembly units, that exhibit feature values of the particular feature within the test limit;

calculating a second frequency of assembly units, in the historical population of assembly units, that exhibit feature values of the particular feature outside of the test limit;

calculating a new line failure rate for the feature based on a combination of the first frequency and the second frequency; and calculating a sensitivity of a failure frequency for the feature:

proportional to a first difference between the new line failure rate and the historical line failure; and inversely proportional to a second difference between the test limit and a tolerance limit assigned to the feature.

* * * * *